US012755569B2

(12) United States Patent
Rubel et al.

(10) Patent No.: US 12,755,569 B2
(45) Date of Patent: Oct. 6, 2026

(54) SYSTEMS AND METHODS FOR AUTOMATICALLY ANNOTATING MULTIMODAL DATA

(71) Applicant: NOBLIS, INC., Reston, VA (US)

(72) Inventors: Ryan Rubel, Reston, VA (US); Andrew Dudash, Reston, VA (US)

(73) Assignee: NOBLIS, INC., Reston, VA (US)

( * ) Notice: Subject to any disclaimer, the term of this patent is extended or adjusted under 35 U.S.C. 154(b) by 264 days.

(21) Appl. No.: 18/758,481

(22) Filed: Jun. 28, 2024

(65) Prior Publication Data

US 2025/0246011 A1 Jul. 31, 2025

Related U.S. Application Data

(60) Provisional application No. 63/627,602, filed on Jan. 31, 2024.

(51) Int. Cl.

*G06V 20/70* (2022.01)
*G01C 21/20* (2006.01)
*G06T 7/70* (2017.01)

(52) U.S. Cl.

CPC ........... *G06V 20/70* (2022.01); *G01C 21/206* (2013.01); *G06T 7/70* (2017.01)

(58) Field of Classification Search

CPC .. G06V 20/70; G06T 7/70; G06T 7/80; G06T 2207/20084; G06T 2207/20081; G01C 21/206

See application file for complete search history.

(56) References Cited

U.S. PATENT DOCUMENTS

| | | | | |
|---|---|---|---|---|
| 11,501,794 B1 * | 11/2022 | Kim | .................... | G10L 15/1815 |
| 11,830,219 B2 * | 11/2023 | Xi | ........................... | G01S 5/163 |
| 12,416,730 B1 * | 9/2025 | Papi | ........................ | G01S 17/86 |
| 2016/0349362 A1 * | 12/2016 | Rohr | ....................... | G01S 13/86 |

(Continued)

OTHER PUBLICATIONS

Hajri, H., Doucet, E., Revilloud, M., Halit, L., Lusetti, B., & Rahal, M. C. (2018). Automatic generation of ground truth for the evaluation of obstacle detection and tracking techniques. arXiv preprint arXiv:1807.05722. (Year: 2018).*

(Continued)

*Primary Examiner* — Vu Le
*Assistant Examiner* — Jack Peter Kraynak
(74) *Attorney, Agent, or Firm* — Morrison & Foerster LLP

(57) ABSTRACT

A system for automatic annotation of multimodal data comprises: an object of interest; a mobile data collection rig comprising an image sensor and a LiDAR sensor; a plurality of mobile beacons located on the object of interest and on the mobile data collection rig; one or more processors and memory. A method for automatic annotation of multimodal data comprises: receiving ultrasonic time of flight data from a plurality of mobile beacons; estimating position data for an object of interest and position data for a mobile data collection rig based on the ultrasonic time of flight data; computing pose information for the object of interest, the mobile data collection rig, an image sensor, and a LiDAR sensor; collecting image data from the image sensor and LiDAR data from the LiDAR sensor; an automatically annotating the image and LiDAR data based on the computed pose information.

29 Claims, 9 Drawing Sheets
(1 of 9 Drawing Sheet(s) Filed in Color)

(56) References Cited

U.S. PATENT DOCUMENTS

| | | | | |
|---|---|---|---|---|
| 2018/0356526 A1* | 12/2018 | Wang | G06V 10/143 |
| 2019/0180467 A1* | 6/2019 | Li | G01S 17/93 |
| 2022/0358333 A1* | 11/2022 | Horowitz | G06V 20/647 |
| 2023/0177849 A1* | 6/2023 | Ambrus | G06V 10/22 382/103 |
| 2026/0057236 A1* | 2/2026 | Wekel | G06N 3/08 |

OTHER PUBLICATIONS

Hajri, H., & Rahal, M. C. (2018). Real time lidar and radar high-level fusion for obstacle detection and tracking with evaluation on a ground truth. arXiv preprint arXiv:1807.11264. (Year: 2018).*

Ngu Nguyen, L., Susarla, P., Mukherjee, A., Lage Cañellas, M., Álvarez Casado, C., Wu, X., . . . & Bordallo López, M. (2023). Non-contact Multimodal Indoor Human Monitoring Systems: A Survey. arXiv e-prints, arXiv-2312.arXiv:1807.11264. (Year: 2023).*

Rubel, R., Dudash, A., Goli, M., O'Hara, J., & Wunderlich, K. (Dec. 2023). Automated Multimodal Data Annotation via Calibration With Indoor Positioning System. In 2023 Seventh IEEE International Conference on Robotic Computing (IRC) (pp. 174-181). IEEE. (Year: 2023).*

Serhan Daniş, F., Teoman Naskali, A., Cemgil, A. T., & Ersoy, C. (2022). An Indoor Localization Dataset and Data Collection Framework with High Precision Position Annotation. arXiv e-prints, arXiv-2209. (Year: 2022).*

Martin-Martin, R., Patel, M., Rezatofighi, H., Shenoi, A., Gwak, J., Frankel, E., . . . & Savarese, S. (2021). Jrdb: A dataset and benchmark of egocentric robot visual perception of humans in built environments. IEEE transactions on pattern analysis and machine intelligence, 45(6), 6748-6765. (Year: 2021).*

Wang, Y., Mao, Q., Zhu, H., Deng, J., Zhang, Y., Ji, J., . . . & Zhang, Y. (2023). Multi-modal 3d object detection in autonomous driving: a survey. International Journal of Computer Vision, 131(8), 2122-2152. (Year: 2023).*

Besl et al. (1992). "A method for registration of 3-d shapes," IEEE Transactions on Pattern Analysis and Machine Intelligence, vol. 14, No. 2, pp. 239-256.

Chaumette et al. (2007). "Visual servo control. i. basic approaches," Robotics Automation Magazine, IEEE, vol. 13, pp. 82-90.

Chen et al. (1992). "Object modelling by registration of multiple range images," Image and Vision Computing, vol. 10, No. 3, pp. 145-155.

Fischler et al. (1981). "Random sample consensus: A paradigm for model fitting with applications to image analysis and automated cartography," Communications of the ACM, vol. 24, No. 6, p. 381-395.

Hajri et al. (2018). "Automatic generation of ground truth for the evaluation of obstacle detection and tracking techniques," arXiv:1807.05722; 7 pages.

He et al. "Mask r-cnn," 2017 IEEE International Conference on Computer Vision (ICCV), Venice, Italy, Oct. 22-29, 2017, pp. 2980-2988.

Ince et al. "Semiautomatic annotation for visual object tracking," in Proceedings of the Virtual IEEE/CVF International Conference on Computer Vision (ICCV) Workshops, Oct. 11-17, 2021, pp. 1233-1239.

Madsen et al. (2004). "Methods for nonlinear least squares problems," Information and Mathematical Modeling; 30 pages.

Marchand et a. (2016). "Pose estimation for augmented reality: A hands-on survey," IEEE Transactions on Visualization and Computer Graphics, vol. 22, No. 12, pp. 2633-2651.

Marion et al. (2018). "Label fusion: A pipeline for generating ground truth labels for real RGBD data of cluttered scenes," IEEE International Conference on Robotics and Automation (ICRA), pp. 3235-3242.

Marvelmind Indoor Navigation System Operating manual, Marvelmind, 2023. Available: https://marvelmind.com/pics/marvelmindnavigationsystemmanual.pdf ; 297 pages.

OpenCV: Camera calibration and reconstruction, https://docs.opencv.org/3.4/d9/doc/groupcalib3d.html#ga50620f0e26e02caa2e9adc07b5fbf24e; Accessed 2022; 66 pages.

Ravi et al. "Accelerating 3d deep learning with pytorch3d," SIGGRAPH Conference and Exhibition on Computer Graphics & Interactive Techniques; Virtually held Dec. 10-13, 2020; 18 pages.

Sager et al. (2022). "labelCloud: A lightweight labeling tool for domain-agnostic 3d object detection in point clouds," Computer-Aided Design and Applications, vol. 19, No. 6, pp. 1191-1206.

Terzakis et al. (2020). "A consistently fast and globally optimal solution to the perspective-n-point problem," in Computer Vision—ECCV 2020, A. Vedaldi, H. Bischof, T. Brox, and J.-M. Frahm, Eds. Cham: Springer International Publishing, 2020, pp. 478-494.

Tkachenko. (2020-2022). Github. HumanSignal Label Studio. https://github.com/heartexlabs/label-studio; 8 pages.

Watanabe et al. (2020). "Automatic construction of dataset with automatic annotation for object detection," Procedia Computer Science, vol. 176, pp. 1763-1772.

"Camera calibration," OpenCV—Python Tutorials: https://docs.opencv.org/4.x/dc/dbb/tutorial py calibration.html, accessed: Oct. 18, 2022; 4 pages.

"Ros camera lidar calibration package," https://github.com/heethesh/lidarcameracalibration; Accessed 2022; 7 pages.

* cited by examiner

SYSTEMS AND METHODS FOR AUTOMATICALLY ANNOTATING MULTIMODAL DATA

CROSS-REFERENCE TO RELATED APPLICATIONS

This application claims the benefit of U.S. Provisional Application No. 63/627,602, filed Jan. 31, 2024, the entire contents of which is incorporated herein by reference.

FIELD

This disclosure relates generally to the field of learned object detection, and more specifically, to multimodal data for training learned object detection models.

BACKGROUND

Learned object models, such as those used in autonomous vehicles, are often trained using multimodal data. Multimodal data includes combined LiDAR and image sensor image data. Multimodal data is widely used in learned object detection due to the sparse, 3D LiDAR point clouds complimenting the dense, 2D images. Due to the complexity of multimodal data, both the LiDAR and image sensor frames of the data must be annotated or labeled with object information in order to be used to train and evaluate learned object detection models. However, labeling the data in both the LiDAR and image sensor frames is laborious, time-consuming, and expensive. Current methods require partial or completely manual data annotation, which significantly slows down the annotation process. Other methods may rely on pre-trained detectors to eliminate the need to annotate multimodal data, but pre-trained detectors are not trained to detect niche objects.

SUMMARY

As explained above, multimodal data must be annotated, or labeled with object information to be used to train and evaluate a learned object detection model. However, the annotation of data in both the LiDAR and image sensor frames must currently be done partially or completely by hand, creating a bottleneck in data collection for training learned object detection models. Accordingly, there is a need for fully automated systems and methods for annotating multimodal data for use in learned object detection models.

Disclosed herein are systems and methods for automatically annotating multimodal data for use in learned object detection models, as well as methods for refining the automatically annotated data to improve accuracy. For example, an object of interest may be sampled with an image sensor and LiDAR sensor mounted on a mobile data collection rig. A plurality of mobile beacons, which may be indoor positioning system (IPS) beacons, may be placed on the object of interest and on the mobile data collection rig. By choosing beacons having a known global coordinate frame, such as the indoor positioning system (IPS) frame, a position of the object of interest and of the mobile data collection rig can be estimated in the global coordinate frame based on ultrasonic time-of-flight data from the mobile beacons. A pose of the object of interest and of the mobile data collection rig can be determined from the estimated positions, and various transformations from the global coordinate frame to coordinate frames of the image sensor and LiDAR sensor can be performed so that the image sensor and LiDAR sensor are calibrated with respect to the global coordinate frame. Since the image sensor and LiDAR sensor are calibrated with respect to the global coordinate frame, image data and LiDAR data can be transmitted to a computer and automatically annotated using a computer program. The captured image data and LiDAR data can be annotated with information corresponding to the object of interest, such as object class, location, pose, and the like.

Additionally, disclosed herein are methods of refining the automatic annotations to increase accuracy. A Random Sample Consensus (RANSAC) algorithm can select points in the LiDAR point cloud to be sampled. The RANSAC algorithm can select and apply a model proposal function, which can be used to estimate a reasonable bounding box described by the sampled points. The model proposal function may be designed based on the properties of the object of interest, such as the shape of the object. Then, a fitness function can be applied to the bounding box generated by the model proposal function to evaluate whether the bounding box is a good fit to the data. If the bounding box is a good fit, it can then be saved to the system, and this process can be repeated iteratively for a fixed number of iterations, until a certain fitness score is reached or until other requirements set by a user are satisfied.

Thus, described herein are systems and methods for automatically annotating multimodal data and refining the annotations using a RANSAC algorithm. The systems and methods described herein can offer a fully automated alternative to cumbersome manual multimodal methods, thus improving the speed, efficiency, and cost-effectiveness of training learned object detection models.

In some embodiments, a method of automatically annotating multimodal data samples is provided. The method may include: receiving data representing ultrasonic time of flight from a plurality of mobile beacons, wherein the mobile beacons are located on an object of interest and on a mobile data collection rig, and wherein the mobile data collection rig comprises an image sensor and a LiDAR sensor; estimating position data for the object of interest and position data for the mobile data collection rig in a global coordinate frame based on the data representing ultrasonic time of flight from the plurality of mobile beacons; computing pose information for the object of interest and pose information for the mobile data collection rig based on the estimated position data of the object of interest and the mobile data collection rig in the global coordinate frame; computing pose information for the image sensor and pose information for the LiDAR sensor based on the computed pose information for the mobile data collection rig; collecting image data from the image sensor and LiDAR data from the LiDAR sensor; determining a first location in the image data based on the computed pose information of the image sensor and determining a second location in the LiDAR data based on the computed pose information of the LiDAR sensor; and automatically annotating the image data with a first set of annotations based on the first location and automatically annotating the LiDAR data with a second set of annotations based on the second location.

In some embodiments, the estimated position data for the object of interest comprises a first portion of estimated position data corresponding to a first mobile beacon and a second portion of estimated position data corresponding to a second mobile beacon.

In some embodiments, the estimated position data for the mobile data collection rig comprises a third portion of estimated position data corresponding to a third mobile beacon and a fourth portion of estimated position data corresponding to a fourth mobile beacon.

In some embodiments, a periphery of an area where the method is to be performed comprises a plurality of stationary beacons.

In some embodiments, estimating position data for the object of interest and position data for the mobile data collection rig in a global coordinate frame comprises transmitting a plurality of signals from each stationary beacon to each mobile beacon.

In some embodiments, the data representing ultrasonic time of flight represents an ultrasonic time of flight from the stationary beacons to the mobile beacons, and wherein estimating position data for the object of interest and position data for the mobile data collection rig in a global coordinate frame comprises triangulating a position of each mobile beacon relative to each stationary beacon based on the data representing ultrasonic time of flight.

In some embodiments, the stationary beacons comprise one or more of indoor positioning system (IPS) transmitters or IPS receivers.

In some embodiments, the global frame is an indoor positioning system (IPS) frame.

In some embodiments, the mobile beacons comprise one or more of IPS transmitters, IPS receivers, inertial measurement unit (IMU) sensors, or global positioning system (GPS) receivers.

In some embodiments, the first and second set of annotations comprise one or more of object of interest class information, object of interest dimensions, object of interest orientation information, and object of interest position information.

In some embodiments, the estimated position data for the mobile data collection rig comprises a third portion of estimated position data corresponding to a third mobile beacon and a fourth portion of estimated position data corresponding to a fourth mobile beacon.

In some embodiments, the first and second set of annotations comprise a bounding box based on the object of interest dimensions.

In some embodiments, the object of interest orientation information comprises a yaw of the object.

In some embodiments, the object of interest position information comprises x, y, and/or z coordinates.

In some embodiments, the method further comprises applying one or more fitness functions to the second set of annotations to calculate a fitness score; and refining the second set of annotations based on the fitness score.

In some embodiments, applying one or more fitness functions to the second set of annotations is performed using a random sample consensus (RANSAC) algorithm.

In some embodiments, applying one or more fitness functions to the second set of annotations is performed using an iterative closest point (ICP) algorithm.

In some embodiments, refining the second set of annotations based on the fitness score comprises generating sample bounding boxes from sampled points in the collected LiDAR data using one or more model proposal functions, wherein the model proposal functions are based on the object of interest.

In some embodiments, refining the second set of annotations based on the fitness score further comprises applying the one or more fitness functions to the sample bounding boxes to determine which sample bounding box has the highest fitness score and replacing the bounding box in the second set of annotations with the sample bounding box having the highest fitness score.

In some embodiments, the fitness score is based on the density of points along edges of the sample bounding box such that a higher density of points along the edges yields a higher fitness score.

In some embodiments, the method further comprises using the annotated data to train a multimodal object detection algorithm configured to accept image data and LiDAR data as an input.

In some embodiments, a system for automatic annotation of multimodal data is provided. The system may include an object of interest; a mobile data collection rig comprising an image sensor and a LiDAR sensor; a plurality of mobile beacons located on the object of interest and on the mobile data collection rig; one or more processors; and memory storing computer program code executable by the one or more processors to cause the system to: receive data representing ultrasonic time of flight from the plurality of mobile beacons; estimate position data for the object of interest and position data for the mobile data collection rig in a global coordinate frame based on the data representing ultrasonic time of flight from the plurality of mobile beacons; compute pose information for the object of interest and pose information for the mobile data collection rig based on the estimated position data of the object of interest and the mobile data collection rig in the global coordinate frame, compute pose information for the image sensor and pose information for the LiDAR sensor based on the computed pose information for the mobile data collection rig; collect image data from the image sensor and LiDAR data from the LiDAR sensor; determine a first location in the image data based on the computed pose information of the image sensor and determine a second location in the LiDAR data based on the computed pose information of the LiDAR sensor; and automatically annotate the image data with a first set of annotations based on the first location and automatically annotate the LiDAR data with a second set of annotations based on the second location.

In some embodiments, the system comprises two or more stationary beacons configured to be positioned in an area where the multimodal data is to be collected.

In some embodiments, each stationary beacon is configured to transmit a signal to each mobile beacon.

In some embodiments, the data representing ultrasonic time of flight represents an ultrasonic time of flight from the stationary beacons to the mobile beacons, and wherein the system further comprises a ground system controller configured to triangulate a position of each mobile beacon relative to each stationary beacon based on the data representing ultrasonic time of flight.

In some embodiments, the system is a GPS system, and wherein the mobile beacons are global positioning system (GPS) receivers.

In some embodiments, the system is an indoor positioning system (IPS).

In some embodiments, the system is an inertial measurement unit (IMU). system, and wherein the mobile beacons are inertial measurement unit (IMU) sensors.

In some embodiments the mobile data collection rig is robotic.

In some embodiments, a non-transitory computer readable storage medium storing one or more programs is provided, the one or more programs comprising instructions, which, when executed by a system comprising: an object of interest, a mobile data collection rig comprising an image sensor and a LiDAR sensor, a plurality of mobile beacons located on the object of interest and on the mobile data collection rig, and one or more processors, cause the system to: receive data representing ultrasonic time of flight from the plurality of mobile beacons; estimate position data for the object of interest and position data for the mobile data collection rig in a global coordinate frame based on the data representing ultrasonic time of flight from the plurality of mobile beacons; compute pose information for the object of interest and pose information for the mobile data collection rig based on the estimated position data of the object of interest and the mobile data collection rig in the global coordinate frame, compute pose information for the image sensor and pose information for the LiDAR sensor based on the computed pose information for the mobile data collection rig; collect image data from the image sensor and LiDAR data from the LiDAR sensor; determine a first location in the image data based on the computed pose information of the image sensor and determine a second location in the LiDAR data based on the computed pose information of the LiDAR sensor; and automatically annotate the image data with a first set of annotations based on the first location and automatically annotate the LiDAR data with a second set of annotations based on the second location.

BRIEF DESCRIPTION OF THE FIGURES

The patent or application file contains at least one drawing executed in color. Copies of this patent or patent application publication with color drawing(s) will be provided by the Office upon request and payment of the necessary fee.

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1:
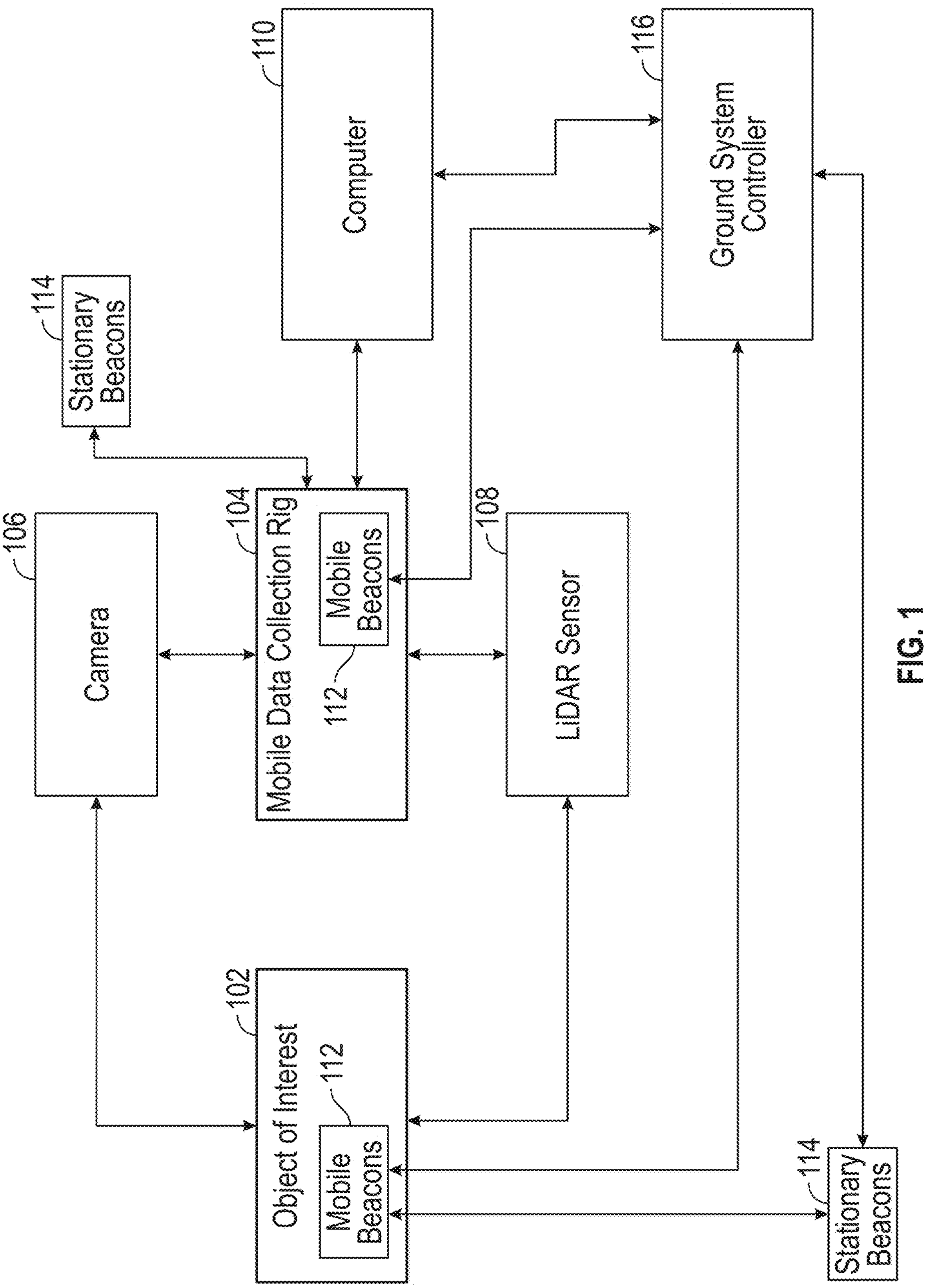
FIG. 1 illustrates a system for automatically annotating multimodal data, in accordance with some embodiments.

Described herein are systems and methods for automatically annotating multimodal data. A system can include an object of interest, a mobile data collection rig having an image sensor and a LiDAR sensor, and a plurality of mobile beacons located on the object of interest and on the mobile data collection rig. The system may also include a plurality of stationary beacons and a ground level controller that are configured to communicate with the mobile beacons. The mobile beacons may be configured to transmit ultrasonic time-of-flight data to a computing device comprising one or more processors, and memory storing computer program code executable by the one or more processors to cause the system to automatically annotate the multimodal data.

A method of automatically annotating multimodal data can include receiving data representing ultrasonic time of flight from a plurality of mobile beacons on an object of interest and on a mobile data collection rig. The method may include estimating position data for the object of interest and position data for the mobile data collection rig in a global coordinate frame based on the ultrasonic time of flight data from the mobile beacons. The method may include computing pose information for the object of interest and mobile data collection rig in the global coordinate frame from the estimated position data. The method may further include calculating a first transformation from the global coordinate frame to an image sensor coordinate frame and calculating a second transformation from the global coordinate frame to a LiDAR sensor coordinate frame based on the computed pose information. A first location of an object of interest can be determined in the image data and a second location of an object of interest can be determined in the LiDAR data, and the image and LiDAR data can be automatically annotated with a first and second set of annotations based on the first and second locations.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

The exemplary system will first be described, followed by a general overview of the exemplary method and a detailed overview of the exemplary method.

Exemplary System

Figure 2:
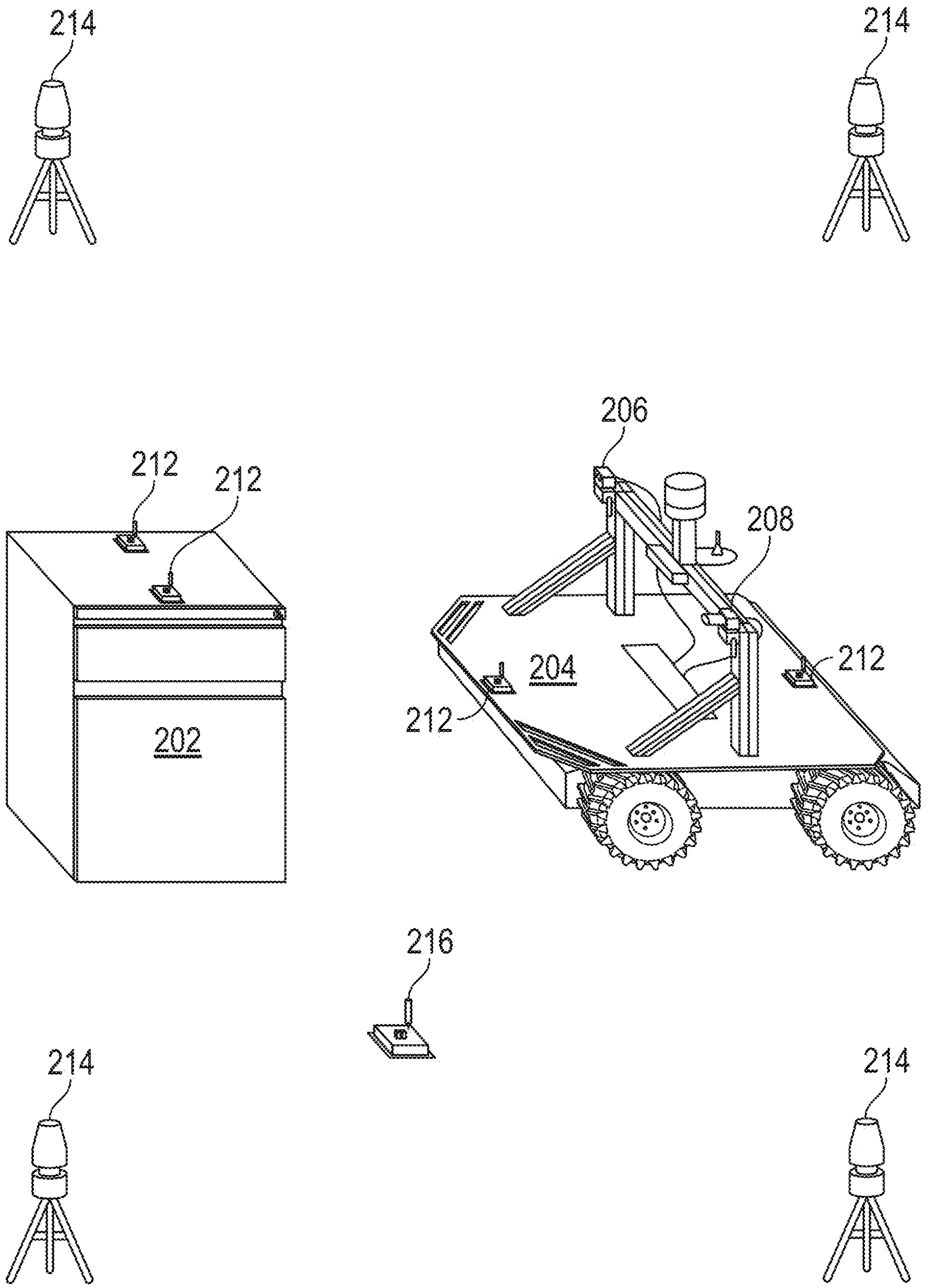
FIG. 2 illustrates a system for automatically annotating multimodal data, in accordance with some embodiments.

FIGS. 1 and 2 illustrate a system for automatically annotating multimodal data, in accordance with some embodiments. Specifically, FIG. 1 depicts a box diagram of various communication pathways between the components of the system, while FIG. 2 depicts the elements of the system as they appear. Referring to FIG. 1, the system can include an object of interest to be sampled 102, and a mobile data collection rig 104. Mobile data collection rig 104 may include an image sensor 106 and a LiDAR sensor 108. In some embodiments, image sensor 106 is a FLIR Blackfly S image sensor. In some embodiments, LiDAR sensor 108 is a 16-channel LiDAR sensor. In some embodiments, other time-of-flight sensors that can either be calibrated directly with respect to mobile beacons or to the image sensor may be used. In some embodiments, an RGBD image sensor may be used. The image sensor 106 and LiDAR sensor 108 may be affixed to a base of a mobile data collection rig on a tripod, a fixed or adjustable post, and so on. In some embodiments, the orientation and/or height of image sensor 106 and LiDAR sensor 108 can be adjusted prior to initiating a data capture session to achieve various perspectives, angles, etc. in the captured data. The orientation of the image sensor 106 and LiDAR sensor 108 relative to mobile data collection rig 104 should remain fixed during calibration, but the sensors do not need to remain fixed during data collection so long as their positions remain fixed with respect to the beacons they are calibrated to, as will be described.

In some embodiments, a plurality of mobile beacons 112 may be placed on the object of interest 102 and mobile data collection rig 104. In some embodiments, there may be greater than or equal to 1, 2, or 3, mobile beacons on the object of interest 102 and/or mobile data collection rig 104. In some embodiments, there may be less than or equal to 2, 3, or 4 mobile beacons on the object of interest 102 and/or mobile data collection rig 104. In some embodiments, mobile beacons 112 may be indoor positioning system (IPS) beacons. In some embodiments, mobile beacons 112 may be inertial measurement unit (IMU) sensors. In some embodiments, mobile beacons 112 may be global positioning system (GPS) receivers. In some embodiments, including in several validation studies that will be further described, mobile beacons 112 may be MarvelMind IPS beacons.

In some embodiments, mobile beacons 112 may be in remote communication with various stationary beacons 114 placed around a periphery of the area where data collection of the object of interest is to take place. In some embodiments, there may be greater than or equal to 3, 6, 9, or 12 stationary beacons 114. In some embodiments, there may be less than or equal to 4, 6, 8, 10, 12, or 14 stationary beacons 114. In some embodiments, the stationary beacons 114 are configured such that there is an unobstructed line of sight of 30 meters or less from a mobile beacon 112 to at least three different stationary beacons 114. If IPS beacons are used, data collection may take place in a controlled laboratory setting. However, the systems and methods described herein may be conducted in an outdoor setting and/or in a field-deployed setting that is not a closed course, track, or laboratory embodiment. For example, in some embodiments, GPS receivers may be used for the mobile beacons 112 for outdoor capabilities.

Each of the stationary beacons 114 can have a known position relative to a global coordinate frame, for example, an IPS frame. By using the known positions of the stationary beacons 114, a position of mobile beacons 112 can be triangulated. Together, the stationary beacons 114 and mobile beacons 112 can define the global coordinate frame. For example, as shown in FIG. 1, stationary beacons 114 may transmit signals that may be received by mobile beacons 112. Based on a time of flight of the signals, the mobile beacons 112 may triangulate their location relative to the stationary beacons 114 to determine the positions of each mobile beacon in the global coordinate frame. In some embodiments, the time-of-flight signals may be ultrasonic signals, radio signals, or combinations thereof.

In some embodiments, instead of mobile beacons 112 receiving time-of-flight signals from stationary beacons 114, the mobile beacons may transmit time-of-flight signals to stationary beacons 114 to triangulate their locations in the global coordinate frame. Whether the mobile beacons and/or stationary beacons are transmitting and/or receiving signals can depend on the system that is used. For example, in an inverse architecture of MarvelMind IPS beacons, stationary beacons transmit ultrasonic signals that can be received by the mobile beacons, although other architectures and configurations are possible. As such, there are double-sided arrows between mobile beacons 112 and stationary beacons 114 in FIG. 1, as well as between other components of the system.

In some embodiments, mobile beacons 112 and/or stationary beacons 114 may also be in remote communication with a ground system controller 116. In some embodiments, mobile beacons 112 may transmit the time-of-flight data from the first signal from the stationary beacons 114 to the ground system controller 116, and the ground system controller 116 may perform the triangulation of the position of each of the mobile beacons 112. In some embodiments, mobile beacons 112 and/or stationary beacons 114 may comprise processors which may perform the triangulation, and the positions of the mobile beacons 112 can be transmitted to ground system controller 116. The ground system controller 116 may also be in remote communication with an external computing device, for example, a computer 110. Ground system controller 116 can transmit signals comprising the position data of the mobile beacons to computer 110, where the method of automatic annotation of the data can be performed.

By placing the mobile beacons 112 on the object of interest 102 and/or mobile data collection rig 104, the positions of the object of interest and the mobile data collection rig in the global coordinate frame can be estimated. Further, by pairing two or more mobile beacons 112 on the object of interest 102 and/or mobile data collection rig 104, pose information for the object of interest 102 and/or the mobile data collection rig 104 can be calculated from the estimated position data. The pose information can be used to automatically annotate the data collected by image sensor 106 and LiDAR sensor 108.

FIG. 2 shows a system for automatically annotating multimodal data, in accordance with some embodiments. As shown, stationary beacons 214 can be arranged around a periphery of the data collection area, while mobile beacons 212 can be placed on an object of interest 202 and mobile data collection rig 204. Stationary beacons 214 may be affixed to the walls of a room or mounted on tripods as shown in FIG. 2. On both the object of interest 202 and the mobile data collection rig 204, orientation uncertainty may be reduced by placing the mobile beacons 212 as far apart as possible or reasonably practical. On the mobile data collection rig 204, the direction of the line formed by the mobile beacons 212 may define a frame from which the sensors on the mobile data collection rig 204 may be calibrated, as will be described. In some embodiments, the mobile beacons may be placed along (e.g., thereby defining) the major axis, though other arrangements are possible. In some embodiments, the mobile beacons 212 are placed such that the angle between the desired forward direction of the object of interest 202 and the line through the two object beacons is known. Additionally, in some embodiments, the translation between the mobile beacons 212 and the desired object center of object of interest 202, used to derive position labels, can be known.

Mobile data collection rig 204 can include image sensor 208 and LiDAR sensor 206. Mobile data collection rig 204 may have wheels as shown and may be moved around during data collection to collect images and point clouds of the object of interest 202 from various perspectives. In some embodiments, mobile data collection rig 204 may have an actuator such as a motor and a power source such as a battery so that it may move under its own power. Mobile data collection rig 204 may be robotic in that it may move in an automated or preprogrammed movement pattern during data collection. In some embodiments, mobile data collection rig may be moved using a remote control and/or can be controlled from computer 110. In some embodiments, mobile data collection rig 204 may be manually moved by a user during data collection.

As shown in FIG. 2, object of interest 202 may be any object larger than mobile beacon 212, and in this example is a file cabinet. Although an object having a rectangular shape is shown for simplicity, the object of interest 202 may be any shape, including irregular shapes, and may or may not have solid faces. For example, a table is used as the object of interest 202 in the example shown in FIG. 8, and the table does not have solid side faces. Further, for use in object detection algorithms in autonomous vehicles, the object of interest may be a car, truck, bicycle, human or animal model, road sign, and the like. As will be explained, the characteristics of the object of interest, such as the object size, shape, density, and the like, may be used to design a model proposal function to be applied to the annotated LiDAR point cloud data in refining the annotations. Further, while objects of interest having any shape may be sampled, the annotated data may include a bounding box, which may have a fitness score that is determined based on the overlap between edges of the bounding box and edges of the object.

As described, mobile beacons 212 may be MarvelMind mobile beacons, which may include a 6D inertial measurement unit (IMU) comprising a 3D accelerometer and 3D gyroscope, as well as 50 mm radio antennas. Mobile beacons 212 and stationary beacons 214 may transmit and/or receive ultrasound on different ultrasonic frequencies. Mobile beacons 212 may also include one or more processors. In some embodiments, each of the one or more stationary beacons 214 may transmit and/or receive ultrasound at a different frequency than the other stationary beacons 214. In some embodiments, mobile beacons 212 and/or stationary beacons 214 may transmit and/or receive ultrasound at a frequency of greater than or equal to 5, 10, 15, 20, 25, 30, or 35 kHz. In some embodiments, mobile beacons 212 and/or stationary beacons 214 may transmit and/or receive ultrasound at a frequency of less than or equal to 10, 15, 20, 25, 30, 35, or 40 kHz. In some embodiments, stationary beacons 214 may transmit and/or receive ultrasound at a frequency of 19, 25, 31, or 37 kHz. During data collection, maintaining an unobstructed line of sight between the mobile beacons 212 and one or more stationary beacons 214 over a distance less than 30 meters may improve the accuracy of the position estimates derived from the position data of the mobile beacons 212.

Ground system controller 216 may be used to control stationary beacons 214 and mobile beacons 212. Ground system controller 216 may include a radio antenna and may communicate with and synchronize signals from stationary beacons 214 and/or mobile beacons 212 via a proprietary radio protocol. In some embodiments, ground system controller 216 may be placed within a 100-meter radius of the stationary beacons 214 and/or mobile beacons 212. In some embodiments, ground system controller 216 may be located within a radius greater than or equal to 20, 40, 60, 80, or 100 meters from stationary beacons 214 and/or mobile beacons 212. In some embodiments, ground system controller 216 may be located within a radius less than or equal to 20, 40, 60, 80, or 100 meters. Referring back to FIG. 1, in some embodiments, ground system controller 116 and/or mobile data collection rig 104 may be in remote communication with one or more computers 110 and may transmit position data collected by the stationary and mobile beacons to the one or more computers 110. The one or more computers may be used to compute pose information on the object of interest 102 and mobile data collection rig 104.

Figure 9:
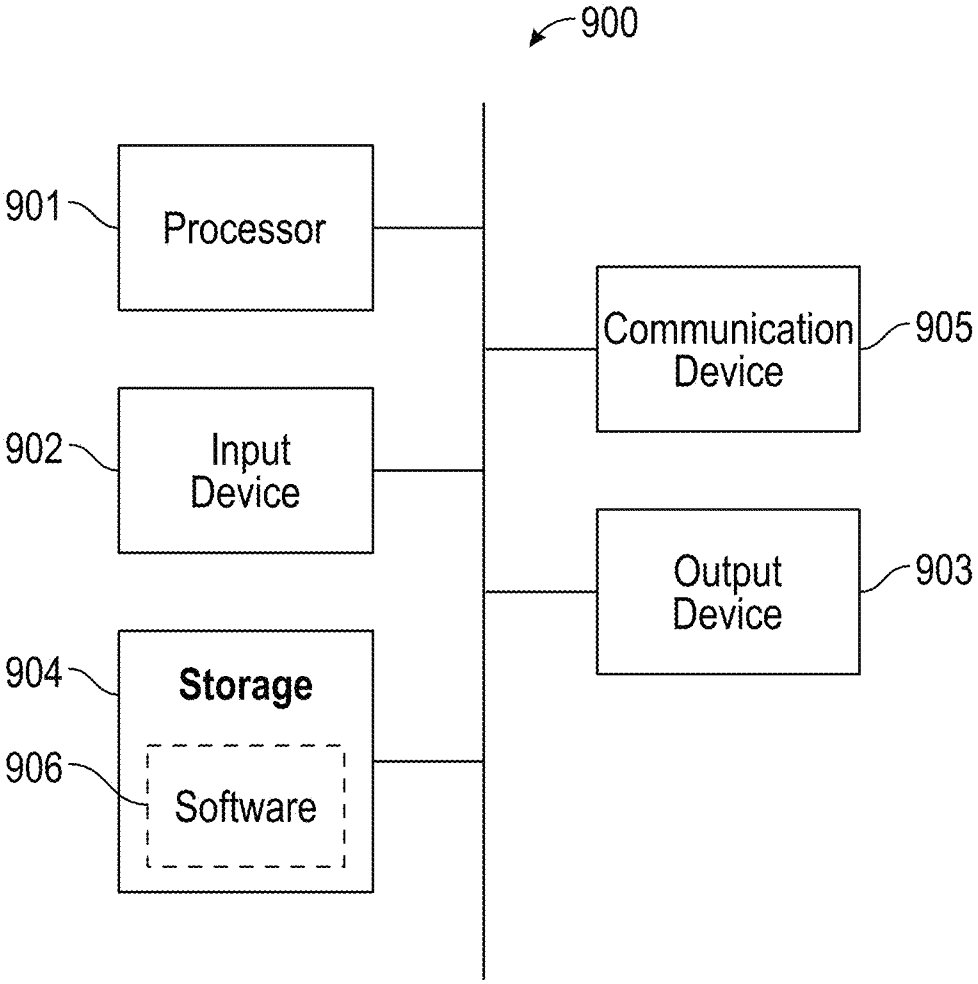
FIG. 9 illustrates a computer, in accordance with some embodiments.

FIG. 9 depicts parts of a computer, in accordance with various embodiments. As will be appreciated, computer 110, described with respect to FIG. 1, can include one or more of the components as will be described with respect to computer 900. Computer 900 can be a component of systems for automatically annotating multimodal data samples described herein, or one or more elements of the systems described herein may be in remote communication with one or more computers such as computer 900.

Computer 900 can be a host computer connected to a network. Computer 900 can be a client computer or a server. As shown in FIG. 9, computer 900 can be any suitable type of microprocessor-based device, such as a personal computer, workstation, server, videogame console, or handheld computing device, such as a phone or tablet. The computer can include, for example, one or more of processor 901, computer input device 902, output device 903, storage 904, and communication device 905. Computer input device 902 can generally correspond to those described above and can either be connectable or integrated with the computer.

Computer input device 902 can be any suitable device that provides input, such as a touch screen or monitor, keyboard, mouse, or voice-recognition device. Output device 903 can be any suitable device that provides output, such as a touch screen, monitor, printer, disk drive, or speaker.

Storage 904 can be any suitable device that provides storage, such as an electrical, magnetic, or optical memory, including a RAM, cache, hard drive, CD-ROM drive, tape drive, removable storage disk, or other non-transitory computer readable medium. Storage 904 can include one storage device or more than one storage device. As used herein, the terms storage, memory, and/or storage medium/media may refer to singular and/or plural devices which may store data and/or code/instructions individually, redundantly, and/or in cooperation with one another, for example in a local and/or cloud storage environment. Communication device 905 can include any suitable device capable of transmitting and receiving signals over a network, such as a network interface chip or card. The components of the computer can be connected in any suitable manner, such as via a physical bus or wirelessly. Storage 904 can be a non-transitory computer-readable storage medium comprising one or more programs, which, when executed by one or more processors, such as processor 901, cause the one or more processors to execute methods described herein.

Software 906, which can be stored in storage 904 and executed by processor 901, can include, for example, the programming that embodies the functionality of the present disclosure (e.g., as embodied in the systems, computers, servers, and/or devices as described above). In some embodiments, software 906 can be implemented and executed on a combination of servers such as application servers and database servers.

Software 906, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 904, that can contain or store programming for use by or in connection with an instruction execution system, apparatus, or device.

Software 906 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 900 can implement any operating system suitable for operating the network. Software 906 can be written in any suitable programming language, such as C, C++, Java, or Python. In various embodiments, application software embodying the functionality of the present disclosure can be deployed in different configurations, such as in a client/server arrangement or through a web browser as a Web-based application or Web service, for example.

Brief Overview of Exemplary Method

Figure 4:
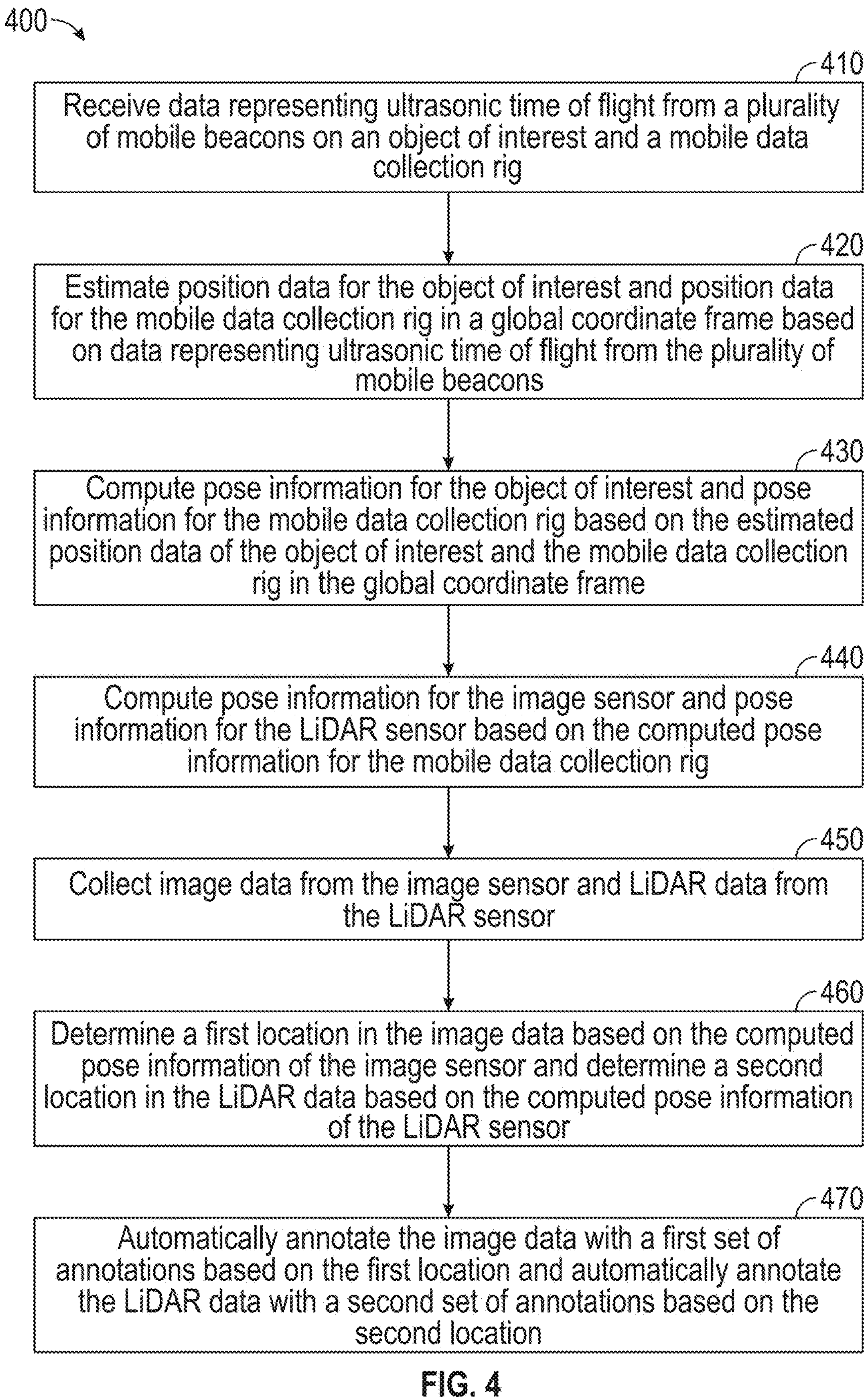
FIG. 4 illustrates a method for automatically annotating multimodal data, in accordance with some embodiments.

FIG. 4 illustrates an exemplary method for automatically annotating multimodal data samples 400, in accordance with some embodiments. At block 410, the method may include receiving data representing ultrasonic time of flight from a plurality of mobile beacons on an object of interest and a mobile data collection rig. In some embodiments, the data representing ultrasonic time of flight may be transmitted from mobile beacons 212 to ground system controller 216 after it is received. At block 420, the method may include estimating position data for the object of interest and position data for the mobile data collection rig in a global coordinate frame based on data representing ultrasonic time of flight from the plurality of mobile beacons. In some embodiments, ground system controller 216 may perform the estimation of the positions, and in some embodiments, computer 110 may perform the estimation of the positions based on the time-of-flight data from the mobile beacons. In some embodiments, the estimated position data can include X, Y, and/or Z coordinates in the global coordinate frame. Based on the dimensions of the object of interest, which can be measured prior to data collection, the positions of the vertices of a 2D bounding box can be determined from the estimated position data, as will be described in the next section.

At block 430, the method may include computing pose information for the object of interest and pose information for the mobile data collection rig based on the estimated position data of the object of interest and the mobile data collection rig in the global coordinate frame. As will be described, this step may involve computing a pose of the object of interest in the global coordinate frame from the mobile beacons on the object of interest and the mobile beacons on the mobile data collection rig and then deriving and applying a rotation matrix to orient the global coordinate frame with respect to the positions of the mobile beacons.

At block 440, the method may include computing pose information for the image sensor and pose information for the LiDAR sensor based on the computed pose information for the mobile data collection rig. As explained here and in further detail below, this may involve a two-step transformation that first computes the image sensor's pose with respect to the mobile data collection rig and then computes the LiDAR sensor's pose with respect to the image sensor. By computing the mobile data collection rig's pose with respect to the global coordinate frame and then computing the poses of the image sensor and LiDAR sensor with respect to the mobile data collection rig, this allows for the mobile data collection rig to be moved around during data collection without needing to re-calibrate the image sensor and LiDAR sensor. Instead, the mobile data collection rig's pose, and in turn the poses of the image sensor and LiDAR sensor, can be estimated in real time in the global coordinate frame by the system.

At block 450, the method may include collecting image data from the image sensor and LiDAR data from the LiDAR sensor, which will then be automatically annotated by the system. To automatically annotate the image and LiDAR data, at block 460, the method may include determining a first location in the image data based on the computed pose information of the image sensor and determining a second location in the LiDAR data based on the computed pose information of the LiDAR sensor. The first location may be an estimation of the location of the object of interest in the image data, while the second location may be an estimation of the location of the object of interest in the LiDAR data. In some embodiments, the image data may be a 2D image. In some embodiments, the LiDAR data may be a point cloud.

At block 470, the method may include automatically annotating the image data with a first set of annotations based on the first location and automatically annotating the LiDAR data with a second set of annotations based on the second location. For example, the image data may be annotated with a first set of annotations comprising a bounding box around the first location in the image data, indicating the estimated location of the object of interest within the 2D image. The LiDAR data may be annotated with a second set of annotations comprising a 3D bounding box around the second location in the LiDAR data, indicating the estimated location of the object of interest within the point cloud. In some embodiments, the annotations may also include object class, object dimensions (e.g., length, width, height), object orientation (roll, pitch, yaw), and object position information (X, Y, Z coordinates) for the object of interest. By leveraging the capabilities of beacons in a positioning system, such as IPS, etc., real-time updates on the positions of the mobile beacons can be sent via a wireless or wired connection to a data collection machine, such as a computer. The data collection machine can be programmed with computer implemented instructions (e.g., a script) that automatically annotates the data as it is received from one or more mobile beacons on the mobile data collection rig and/or the object or interest.

As will be explained in the next section, method 400 may also include refining the second set of annotations in the LiDAR data using a random sample consensus (RANSAC) algorithm. Prior to refinement, the system may be configured with various model proposal functions that are configured to generate sample bounding boxes based on specific characteristics of various objects of interest. The RANSAC algorithm may randomly select from model proposal functions designed from the characteristics of the object of interest, which will generate a sample bounding box based on a number of random points sampled from points near the unrefined annotation in the point cloud. A fitness function may be applied to each bounding box to determine how well the sample bounding box fits the points in the underlying point cloud and assign the sample bounding box a fitness score accordingly. The sample bounding box having the highest fitness score may be saved by the RANSAC algorithm and may replace the automatically annotated second set of annotations in the LiDAR data (e.g., the automatically annotated bounding box). This process may be repeated a fixed number of times, iteratively improving the accuracy of the bounding box in the point cloud. In some embodiments, instead of a RANSAC algorithm, an iterative closest point (ICP) algorithm may be used to perform this step.

Detailed Explanation of Exemplary Method

This section provides more technical and mathematical detail regarding the steps of method 400 described above, starting first with multimodal data collection and automatic annotation, followed by refinement of the automatic annotations and various examples evaluating the performance of the method.

A. Multimodal Data Collection and Annotation

As described, method 400 may include receiving data representing ultrasonic time of flight from a plurality of mobile beacons on an object of interest and a mobile data collection rig at block 410.

Then, method 400 may include estimating position data for the object of interest and position data for the mobile data collection rig in a global coordinate frame based on data representing ultrasonic time of flight from the plurality of mobile beacons at block 420. Determining the positions of the object of interest and mobile data collection rig allow for the poses of the image sensor and LiDAR sensor with respect to the object of interest to be estimated for use in automatically annotating collected data.

At block 430, method 400 may include computing pose information for the object of interest and pose information for the mobile data collection rig based on the estimated position data of the object of interest and the mobile data collection rig in the global coordinate frame.

In embodiments where the mobile beacons are IPS beacons, a traditional IPS beacon only estimates position, rather than pose. To estimate the pose information of the object of interest and mobile data collection rig in the IPS frame, two beacons, $P_{front}$ and $P_{rear}$ may be paired together on each of the object of interest and mobile data collection rig.

Beginning with the object of interest, to compute a pose in the global IPS frame, the z-axis of a frame between $P_{front}$ and $P_{rear}$ may be constrained to be parallel to that of the global coordinate frame. The z-coordinates $z_{front}$, $z_{rear}$ of the object of interest can thus be the average of the z-coordinates of $P_{front}$ and $P_{rear}$ in the global IPS coordinate frame as follows:

$$z_{front}, z_{rear} \leftarrow \frac{1}{2}(z_{front} + z_{rear}) \tag{1}$$

Mobile beacons can broadcast their positions in the global IPS frame, and $\overset{H}{\text{frame}}$ can frame be a frame that is defined relative to the global IPS frame in terms of the component mobile beacons. As determined specifically with respect to the object of interest, $\overset{H}{\text{frame}}$ is denoted as $\overset{H}{\text{obj}}$. With respect to the mobile data collection rig, frame $\overset{H}{\text{frame}}$ is denoted as $\overset{H}{\text{rig}}$. $\overset{H}{\text{obj}}$ and $\overset{H}{\text{rig}}$ can both be determined in a similar manner. The mobile beacons can be placed within this frame on the object of interest and mobile data collection rig so as to maximize their pairwise distance and improve pose estimation accuracy.

The rotation matrix can be defined by three mutually orthogonal unit vectors describing the axes of $\overset{H}{\text{frame}}$. The x-axis may be defined as the unit vector pointing from the rear mobile beacon on the object of interest to the front mobile beacon on the object of interest, as follows:

$$\hat{x} = \frac{P_{front} - P_{rear}}{\|P_{front} - P_{rear}\|} \quad 2)$$

It can be assumed that the xy-plane of $H_{frame}$ is parallel to the xy-plane of the global IPS frame. Thus, the z-axes of these frames are parallel:

$$\hat{z} = [0\,0\,1]^T \quad (3)$$

Since the y-axis must be mutually orthogonal with both the x- and z-axes, it can be obtained by taking the cross product of x and z like so:

$$\hat{y} = \hat{x} \times \hat{z} \quad 4)$$

which leads to the rotation matrix from the global IPS frame to the IPS frame with respect to the mobile beacon:

$$\underset{ips \leftarrow frame}{R} = \begin{bmatrix} \uparrow & \uparrow & \uparrow \\ \hat{x} & \hat{y} & \hat{z} \\ \downarrow & \downarrow & \downarrow \end{bmatrix} \quad 5)$$

For, $H_{obj}$, the IPS frame specifically defined with respect to the object of interest, the front beacon can become the origin of the frame relative to the mobile beacons on the object of interest. The pose of the IPS frame defined by the mobile beacons relative to the global IPS frame can be calculated as follows:

$$\underset{ips \leftarrow frame}{T} = \begin{bmatrix} \underset{ips \leftarrow frame}{R} & P_{front} \\ \vec{0} & 1 \end{bmatrix} \quad 6)$$

A similar process can be repeated to define an IPS frame in terms of the mobile beacons on top of the mobile data collection rig, $H_{rig}$, by determining a transformation from the frame defined by the mobile beacons on the mobile data collection rig to the global IPS frame, $T_{ips \leftarrow rig}$.

By applying these transformations to the position data calculated with respect to the object of interest and mobile data collection rig before data collection begins, a ground truth pose can be estimated for the object of interest and mobile data collection rig. The pose of the object of interest relative to the LiDAR and image sensor may then be estimated from the estimated pose of the mobile data collection rig and the calibrations of the sensors calibrated relative to it.

Figure 3:
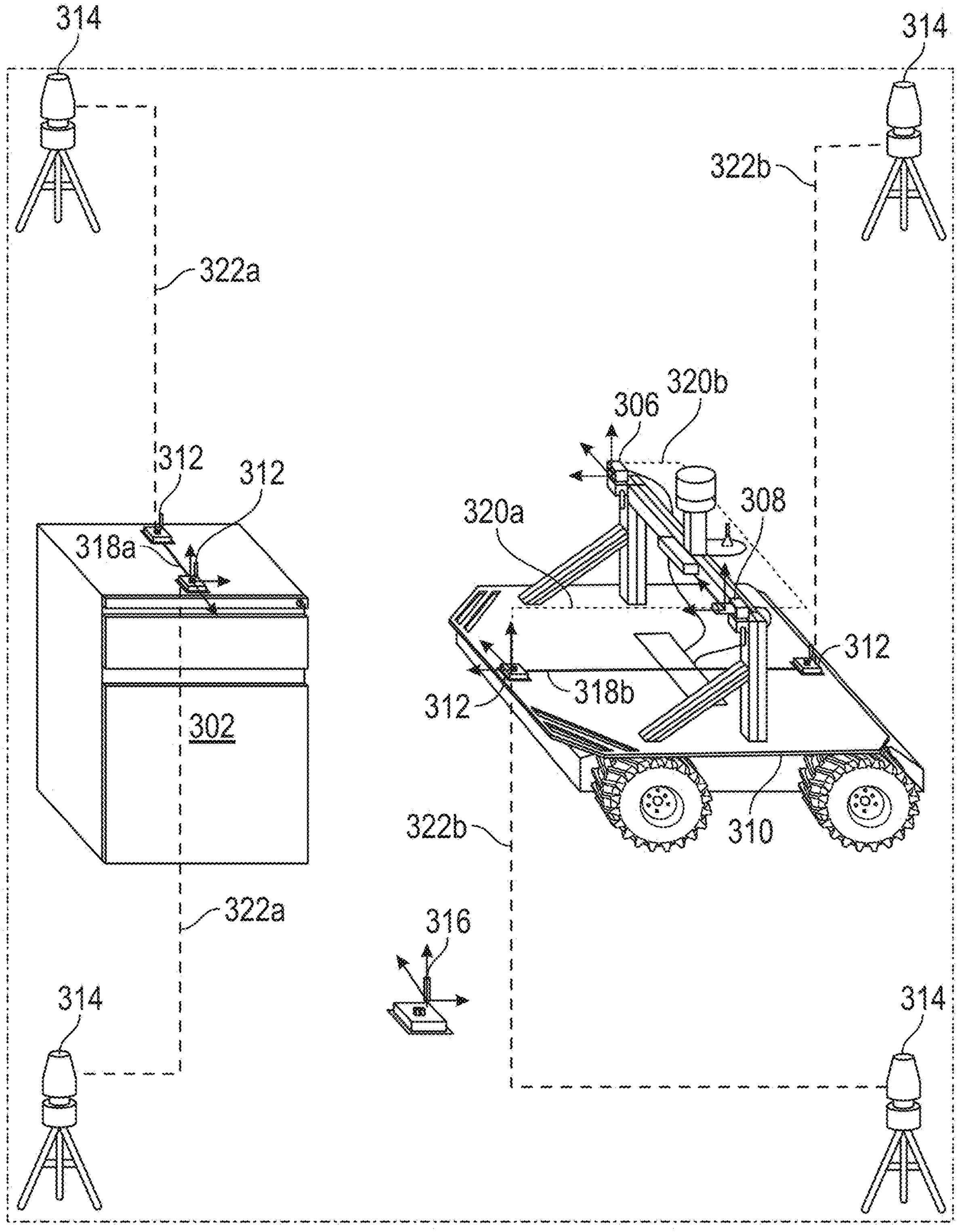
FIG. 3 illustrates various coordinate transformations performed during a method for automatically annotating multimodal data, in accordance with some embodiments.

FIG. 3 illustrates examples of the various transformations of the coordinate frames that can be used in the method 400. The transformation from the frame defined by the mobile beacons on the object of interest to the global IPS frame, $T_{ips \leftarrow obj}$ described above, is illustrated as the dashed lines 322*a* from stationary beacons 314 to the mobile beacons 312 on the object of interest 302. The frame 318*a*, $H_{obj}$, is illustrated by the arrows coming from the front mobile beacon 312 on the object of interest. The x-axis is the line near 318*a*, the y-axis is the line parallel to the top of the filing cabinet (object of interest 302), and the z-axis is the line perpendicular to both the x- and y-axis as described. Similarly, the transformation from the global IPS frame to the frame defined by the mobile beacons on the mobile data collection rig, $T_{rig \leftarrow ips}$, is shown as the dashed lines 322*b* from stationary beacons 314 to mobile beacons 312 on the mobile data collection rig 310. The frame 318*b*, $H_{rig}$, is illustrated by the arrows coming from the front mobile beacon 312 on the mobile data collection rig 310, with the x-axis being the line near 318*b*, the y-axis being the line parallel to the base of the mobile data collection rig, and the z-axis being the line perpendicular to both the x- and y-axis as described.

Turning back to FIG. 4, at block 440, the method may include computing pose information for the image sensor and pose information for the LiDAR sensor based on the computed pose information for the mobile data collection rig. Computing the poses of the image sensor and LiDAR sensor with respect to the ground truth pose of the mobile beacons can allow for the mobile data collection rig to be repositioned during data collection without requiring recalibration.

The image projection of a mobile beacon on the object of interest to the camera can follow the below equation:

$$p_{beacon} = P \cdot \underset{cam \leftarrow rig}{T} \cdot \underset{rig \leftarrow ips}{T} \cdot P_{beacon} \quad 7)$$

where $P_{beacon}$ (either $P_{front}$ or $P_{rear}$) denotes the mobile beacon's position in the global IPS frame. The positions of the mobile beacons and $T_{rig \leftarrow ips}$ can be determined in a similar manner as Equations 1-6 above, as will be described. Further, P denotes a projection matrix of the image sensor. This can be calibrated offline, for example, using an OpenCV implementation of the standard checkerboard method. For example, the image sensor can be calibrated by taking pictures of a checkerboard with known square sizes and using an image analysis system to detect the corners of the checkerboard in each calibration image. An overconstrained system of equations can be solved to jointly estimate the pose of the checkerboard in each image and the intrinsic parameters of the camera.

Additionally, $P_{beacon}$ denotes the mobile beacon's observed position within a calibration image. $P_{beacon}$ can be estimated by taking calibration images of mobile beacons of a known position and then manually annotating a set of calibration images to include the center of each beacon. During image sensor calibration, images can be taken of mobile beacons in different locations. The corresponding locations of the mobile beacons in the global IPS frame can be recorded. A human can manually annotate the center of the beacon(s) in each calibration image. Since the image sensor is rigidly attached to a pair of mobile beacons on the mobile data collection rig, the relative pose between the calibration mobile beacons and the mobile beacons at the base of the mobile data collection rig may be determined in the manner described with respect to Equations 1-6 to estimate $T_{ips\leftarrow rig}$. In some embodiments, the respective averages of $P_{front}$ and $P_{rear}$ can be taken from a plurality of calibration images prior to estimating $T_{ips\leftarrow rig}$ to reduce error propagation due to noise during calibration. In some embodiments, the number of calibration images may be less than or equal to 5, 10, 15, 20, 25, or 30 images. In some embodiments, the number of calibration images may be greater than or equal to 1, 6, 11, 16, 21, or 27 images.

Accordingly, the only unknown in Equation 7 becomes $T_{ips\leftarrow rig}$, which can thus be estimated with a PnP solver. For example, OpenCV's solvePnPRansac( ) can be used to solve for $T_{cam\leftarrow rig}$. To prevent errors in the manual annotations in the calibration images from propagating further, null distortion coefficients may be entered into solvePnPRansac( ) and the undistorted images may be manually annotated.

Additionally, block 440 involves computing pose information for the LiDAR sensor. Since the LiDAR sensor is rigidly attached to the mobile data collection rig, like the image sensor, $T_{cam\leftarrow rig}$ can be calculated offline similar to $T_{cam\leftarrow rig}$. Any suitable LiDAR-camera calibration package may be used.

Thus, two transformations can be solved for at block 440: $T_{cam\leftarrow rig}$ and $T_{cam\leftarrow rig}$. Referring back to FIG. 3, $T_{cam\leftarrow rig}$ is represented by dashed line 320*a* from the mobile beacon on the mobile data collection rig to the image sensor 308, while $T_{cam\leftarrow rig}$ is represented by the dashed line 320*b* from the image sensor 308 to the LiDAR sensor 306.

Accordingly, the transformations shown in FIG. 3 and described with respect to blocks 410-440 of FIG. 4 thus far can be determined offline and prior to data collection as part of the calibration of the mobile beacons, image sensor, and LiDAR sensor. What follows is a description of the automated annotation process that can take place during data collection.

At block 450, the method can include collecting image data and LiDAR data of the object of interest using the image sensor and LiDAR sensor on the mobile data collection rig. As described above, by calibrating the image and LiDAR sensor with respect to the global IPS frame prior to data collection, this allows for the mobile data collection rig to move around the object of interest during data collection.

Since the image sensor and LiDAR sensor are fixed to the mobile data collection rig, the pose of the object of interest relative to the mobile data collection rig frame can be determined in order to annotate the data as they are collected by the sensors. This pose, $T_{rig\leftarrow obj}$, may be estimated in real time, in accordance with the following equation:

$$T_{rig\leftarrow obj} = T_{rig\leftarrow ips} \cdot T_{ips\leftarrow obj} \tag{8)}$$

The manner in which $T_{ips\leftarrow obj}$ and $T_{rig\leftarrow ips}$ (e.g. the inverse of $T_{ips\leftarrow rig}$) can be determined is described above with respect to step 430. These transformations can be repeatedly computed live in the same manner, as the mobile data collection rig and/or object of interest may be moved during data collection. This allows for a real-time estimate of the transformation $T_{rig\leftarrow obj}$.

$T_{rig\leftarrow obj}$ can be used to compute $T_{cam\leftarrow obj}$, the object's pose in the image sensor frame, and $T_{lidar\leftarrow obj}$, the object's pose in the LiDAR sensor frame. These transformations allow for the labels to be automatically generated in the image sensor and LiDAR frames, which allows for the sensor data to be used to train a perception algorithm. The pose of the object of interest in the image sensor frame $T_{cam\leftarrow obj}$ can be computed by the following equation:

$$T_{cam\leftarrow obj} = T_{cam\leftarrow rig} \cdot T_{rig\leftarrow obj} \tag{9)}$$

Since the image sensor is fixed to the mobile data collection rig, $T_{cam\leftarrow rig}$ is a known constant, found at block 440 above. Thus, the unknown $T_{cam\leftarrow obj}$ can be solved using the real-time calculation of $T_{rig\leftarrow obj}$. The object's position on the image plane may then be found by applying the camera's projection matrix to the position component of the object's pose:

$$p_{obj} - P \cdot T_{cam\leftarrow obj} \cdot [0\,0\,0\,1]^T \tag{10)}$$

Since the LiDAR sensor is fixed relative to the mobile data collection rig and the image sensor, the pose of the object of interest relative to the LiDAR sensor frame, $T_{lidar\leftarrow obj}$, can be determined using $T_{cam\leftarrow obj}$ by the following equation:

$$T_{lidar\leftarrow obj} = T_{lidar\leftarrow cam} \cdot T_{cam\leftarrow obj} \tag{11)}$$

As explained above, since $T_{lidar\leftarrow cam}$ is a known constant, the unknown $T_{lidar\leftarrow obj}$ can be solved once $T_{cam\leftarrow obj}$ is determined.

As the images are collected and the object pose is transformed into the image sensor and LiDAR sensor frames, at block 460, the method can include determining a first location in the image data based on the computed pose information of the image sensor and determining a second location in the LiDAR data based on the computed pose information of the LiDAR sensor. As used herein, the "first location" may correspond to a location of the object of interest in the 2D image to be annotated, while the "second location" may correspond to a location of the object of interest in the 3D LiDAR point cloud to be annotated.

For the annotation of the collected image data, in addition to pose, the remaining dimensions of the object of interest can be measured. In some embodiments, this can be performed before data collection. The mobile beacons on the object of interest can be used to measure the object dimensions. Using the mobile beacons, the center of the object of interest in the global IPS frame can be computed using the following equation:

$$C_{obj} = \frac{1}{2}(P_{front} + P_{rear}) - [0\,0\;\; h_{obj}/2]^T \tag{12)}$$

where $h_{obj}$ denotes the height of the object of interest, while $P_{front}$ and $P_{rear}$ are the positions of the front and rear mobile beacons on the object of interest. Bounding box vertices can be determined from the center coordinate using the object of interest's dimensions. These vertices can then be transformed into the camera frame in accordance with the following equation:

$$V_{cam} = \underset{cam\leftarrow rig}{T} \cdot \underset{rig\leftarrow ips}{T} \cdot V_{ips} \tag{13}$$

where $V_{ips} \in \mathbb{R}^{4\times 8}$ is a matrix of 3D homogeneous object vertices. The image projections of the object vertices can be computed by solving the following equation:

$$V_{image} = PV_{cam} \tag{14}$$

where P is the image sensor projection matrix, and $V_{cam}$, the bounding box vertices in the camera frame, can be determined in equation 13 above.

$V_{image}$ can then be converted to 2D Euclidean coordinates, such that $V_{image} \in \mathbb{R}^{2\times 8}$. The 2D bounding box label to be annotated around the object of interest in the image data can then be computed from the extrema of the projected 3D vertices through the following equations:

$$(u_0, v_0) = (\min([1\ 0] \cdot V_{image}), \min([0\ 1] \cdot V_{image})) \tag{15}$$

$$(u_1, v_1) = (\max([1\ 0] \cdot V_{image}), \max([0\ 1] \cdot V_{image})) \tag{16}$$

where $(u_0, v_0)$ and $(u_1, v_1)$ denote the upper left and lower right corners of the bounding box label, respectively.

The 3D camera frame annotations, determined from equation 13 above, can then be transformed from the camera frame to the LiDAR frame using the transformation $\underset{lidar\leftarrow cam}{T}$, determined at block 440 above, by solving the following equation:

$$V_{lidar} = \underset{lidar\leftarrow cam}{T} \cdot V_{cam} \tag{17}$$

This can result in a 3D bounding box that can be annotated in the LiDAR point cloud at a location corresponding to the object of interest in the LiDAR point cloud.

As mentioned previously, the annotations can also include object of interest class information, object of interest dimensions, object of interest orientation information (e.g., yaw), and object of interest position information (e.g., X, Y, Z coordinates). These can be determined, for example, through measuring the dimensions of the object of interest, determining position and orientation from the transformed 3D vertices, annotating the image data with this information and/or its projection, transforming these annotations to the LiDAR frame using equation 16 above, and annotating the LiDAR point cloud data accordingly. The class information, dimensions, etc. can be recorded in a lookup table, with each mobile beacon identified using a unique identifier and associated with the corresponding dimensions, orientation information, position information, and class information.

Thus, as described with respect to block 460, equations 11-16 can be used to determine the dimensions and location of a bounding box to be placed around the object of interest in the image sensor data and LiDAR sensor data. At block 470, the image and LiDAR data can be automatically annotated with these annotations describing the object of interest. As mentioned above, the mobile data collection rig may be in communication with a computer, processing system, etc. The mobile data collection rig may transmit the image sensor and LiDAR sensor data to the computer, which may perform the various transformations and calculations described and automatically annotate the image sensor and LiDAR sensor data using a multimodal data annotation program. In some embodiments, the program may record the positions of the mobile beacons as they are determined by the system, and the program may run one or more scripts that cause the multimodal data to be automatically annotated as it is received. In some embodiments, any suitable programming language (e.g., a script language) can be used to configure the one or more scripts, such as Python or JavaScript.

Since each step in the two-step transformation $\underset{cam\leftarrow rig}{T}$ and $\underset{lidar\leftarrow cam}{T}$ has its own uncertainties that can sequentially propagate with each step, the automatically generated LiDAR point cloud annotations may include appreciably more error than the automatically generated image data annotations. Accordingly, the following section describes additional steps that may be used in method 400 to refine the LiDAR point cloud annotations for improved accuracy.

B. Annotation Refinement

The LiDAR annotations may be refined by applying one or more fitness functions to the data using a random sample consensus (RANSAC) algorithm. An example RANSAC algorithm 500 is shown in Table 1 below.

TABLE 1

Generalized RANSAC

```
function RANSAC ({ℝ3} pcd, {MPF} funcs, n ∈ ℕ)
  mpf ← f ∈ funcs, chosen at random
  p ← P ⊆ pcd, chosen at random
  best_model ← mpf (p)
  best_fitness ← fitness (best_model)
  for i ∈ n do
    mpf ← f ∈ funcs, chosen at random
    p ← P ⊆ pcd, chosen at random
    new_model ← mpf (p)
    new_fitness ← fitness (new_model)
    if new_fitness > best_fitness then
      best_fitness ← new_fitness
      best_model ← new_model
    end if
  end for
  return best_model
end function
```

In some embodiments, an iterative closest point (ICP) algorithm can be used instead of a RANSAC algorithm. The RANSAC algorithm can be used to sample 1) points within the LiDAR point cloud, and 2) various functions, called model proposal functions, that can be used to generate a sample bounding box (e.g., sample data annotation) from the sample points. After sampling both the points and the model proposal functions to generate sample bounding boxes, the RANSAC algorithm can then apply a fitness function to the sampled points to determine a fitness score for how well the sample bounding boxes fit the sampled points. The annotation on the LiDAR point cloud can then be replaced with the highest scoring bounding box, and this process can be repeated a predetermined number of times until the accuracy of the bounding box is iteratively improved.

The model proposal functions to be applied by the RANSAC algorithm can be designed specifically based on characteristics of an object of interest to be sampled. For example, if an object of interest resembles a rectangular prism, such as the filing cabinet in FIGS. 2-3, one model proposal function may be designed that encompasses seeing a point from the front, or seeing one from the side, etc. The model proposal functions may be designed in advance of data collection and may be stored in the computer, processor, etc. to be accessed by the RANSAC algorithm during refinement.

More particularly, to design a model proposal function for a filing cabinet, the ground plane can be estimated from point cloud points within distance r from the unrefined bounding box label. The ground plane can be denoted as G and its unit normal can be denoted as $\hat{n}$. Model proposal functions can first project the sampled points onto the ground plane, ensuring that the bottom face of the bounding box proposal is tangent to the ground. These projected points can be denoted as $P_1$, $P_2$, and $P_3$, and unit vectors $\hat{v}_1$ and $\hat{v}_2$ can be denoted as:

$$\hat{v}_1 = \frac{P_1 - P_3}{\|P_1 - P_3\|} \tag{18}$$

$$\hat{v}_2 = \frac{P_2 - P_3}{\|P_2 - P_3\|} \tag{19}$$

The model proposal function can aim to correct the angle between $\vec{l}$ and $\vec{w}$, forcing a right angle and ensuring a rectangular bounding box. To distribute the angular correction evenly, $\vec{l}$ and $\vec{w}$ can be constructed such that they are equal angles away from the angle bisector of $\hat{v}_1$ and $\hat{v}_2$. A vector bisector can be constructed as follows:

$$\hat{s} = \frac{1}{\sqrt{2}}(\hat{v}_1 + \hat{v}_2) \quad 20)$$

Because the sample points can be projected onto G, $\hat{v}_1$ and $\hat{v}_2$. lie in G, and so does $\hat{s}$. Therefore, $\hat{s}$ is orthogonal to $\hat{n}$, so an orthogonal vector may be constructed as:

$$\hat{o} = \hat{n} \times \hat{s} \quad 21)$$

By constructing $\vec{l}$ and $\vec{w}$ to lie in G and bisect the angles formed between $\hat{s}$ and $\hat{o}$ and $\hat{s}$ and $-\hat{o}$, respectively, $\vec{l}$ and $\vec{w}$ cam ne orthogonal both to each other and to $\hat{n}$. Therefore:

$$\vec{w} = \frac{w}{\sqrt{2}}(\hat{s} - \hat{o}) \quad 22)$$

$$\vec{l} = \frac{l}{\sqrt{2}}(\hat{s} + \hat{o}) \quad 23)$$

where w denotes the object's measured width and l denotes the object's measured length, which can be determined prior to data collection.

Because the proposed bounding box must be tangent to the ground plane, $\vec{h}$ will be parallel to $\hat{n}$:

$$\hat{h} = h_{obj}\hat{n} \quad 24)$$

Finally, a series of object-specific assumptions can be embodied by a model proposal function, which can propose a bounding box around the object of interest based on the sampled points and the object-specific assumptions. For example, in the case of a filing cabinet as the object of interest, one model proposal function might assume that vertex $P_3$ above is the left front vertex of the bounding box. A different model proposal function may be designed that assumes that $P_3$ is the right front vertex of the bounding box, thus allowing for refinement across multiple viewing angles.

Model proposal functions may also be designed for irregular objects, such as a table. For example, if an object of interest is a table with a stem and base, a model proposal function can be designed that assumes that a point falls on the stem of the table, rather than a corner. Additionally, a model proposal function may be designed that removes all points below a minimum height so as to align a bounding box with the table's edge rather than a point on a table leg, the ground, etc. Such assumptions can be made based on the geometry, characteristics, etc. of the object of interest that is to be sampled, and model proposal functions can be specifically designed to generate sample bounding boxes for that object.

Referring back to the RANSAC algorithm, for each iteration of bounding box refinement, RANSAC may select an appropriate model proposal function and a plurality of points from within a distance r of the unrefined annotation. Points in the ground plane may be removed using RANSAC to prevent the RANSAC refinement from selecting the ground points for the sample bounding box. Given the three sampled points, the model proposal function can return a sample bounding box appropriate for the object of interest.

However, the initial sample bounding boxes generated by the model proposal functions may not be accurate. To determine which sample bounding boxes are the most accurate, such that they can be iteratively improved, the RANSAC algorithm may apply a fitness function to the sample bounding boxes and determine a fitness score based on one or more pre-defined criteria.

For example, when a bounding box is to be applied over point cloud data, one may assume that an accurate bounding box contains many points near its faces. Based on this assumption, a fitness function can be defined as follows:

$$f(S) = |A| + |B| + |C| \quad 25)$$

where S represents all points within a shell of thickness $\pm\delta$, measured along the normal of each of the box's faces, surrounding the box. A, B, $C \subseteq S$ can correspond to the sets of points within the shell near each of the three different pairs of parallel faces. Note that this does not define a partition of S; points near edges may be within distance 8 of multiple faces.

Thus, this fitness function can encourage sampled bounding boxes generated by the model proposal functions that align with objects' true edges, which reflect many points, rather than object regions that are flat because an occlusion has blocked all points beyond a certain threshold. Then, as shown above in Table 1, a fitness score is generated for the sample bounding box based on how well it meets the requirements of the fitness function. The RANSAC algorithm can be programmed to replace the prior sample bounding box on the LiDAR point cloud with the next best sample bounding box, and the process can be iteratively repeated for hundreds, thousands, tens of thousands of times, etc. for improved LiDAR point cloud annotation accuracy.

Exemplary systems and methods for automatically annotating multimodal data, and optionally refining the annotations, have been described. Following are several examples evaluating exemplary systems and methods as described herein.

EXAMPLES

Example 1. Evaluating Camera-IPS Calibration and RANSAC

To assess the effectiveness of imposing planar constraints in improving IPS-camera calibration, calibration results were compared with and without the constraints in this example. As described above, one of the planar constraints that can be imposed is constraining the z-axis of the frames defined by the mobile beacons to be parallel to that of the global IPS frame by replacing the z-coordinates of both $P_{front}$ and $P_{rear}$ with their average.

Results were compared between using SQPNP as the PnP solver and a virtual visual servoing (VVS) scheme with and without the use of RANSAC to determine inliers. The OpenCV implementations of each algorithm were used, and RANSAC was evaluated with two reprojection error thresholds for selecting inliers, δ=8 and δ=25 (in pixels). The results are shown below in Table 2. Rows labeled RANSAC involved the RANSAC-based sampling scheme combined with the SQPNP solver and VVS, while rows marked with SQPNP passed all point correspondences to SQPNP and VVS without the RANSAC sampling scheme.

TABLE 2

Quantitative Comparison of PNP Solvers

| Method | Planar Constraint | # Inliers (out of 63) | Root-Mean-Square Error (RMSE) (pixels) |
|---|---|---|---|
| RANSAC (δ = 8) | No | 32 | 3.53282 |
| RANSAC (δ = 8) | Yes | 57 | 2.39437 |
| RANSAC (δ = 25) | No | 55 | 7.51034 |
| RANSAC (δ = 25) | Yes | 63 | 3.23265 |
| SQPNP | No | n/a | 10.6648 |
| SQPNP | Yes | n/a | 3.23265 |

As indicated in Table 2, it was found that introducing the planar constraint reduced the RMSE in every instance when compared with its non-constrained counterpart. Additionally, when RANSAC (δ=25 pixels) with a planar constraint was compared to SQPNP with a planar constraint, both yielded the same RMSE, but RANSAC (δ=8 pixels) with a planar constraint yielded the lowest RMSE. The SQPNP without the planar constraint yielded the highest RMSE.

Example 2. Point Cloud Label Refinements

In this example, the effectiveness of the annotation refinement method using RANSAC and its robustness to missing data were evaluated. One of the samples having a filing cabinet as the object of interest was selected. The point cloud in the immediate region surrounding the unrefined annotation was downsampled at 50 random samples at various sampling proportions of the point cloud. Then, RANSAC was used to refine the annotation based on the downsampled point cloud.

Figure 5:
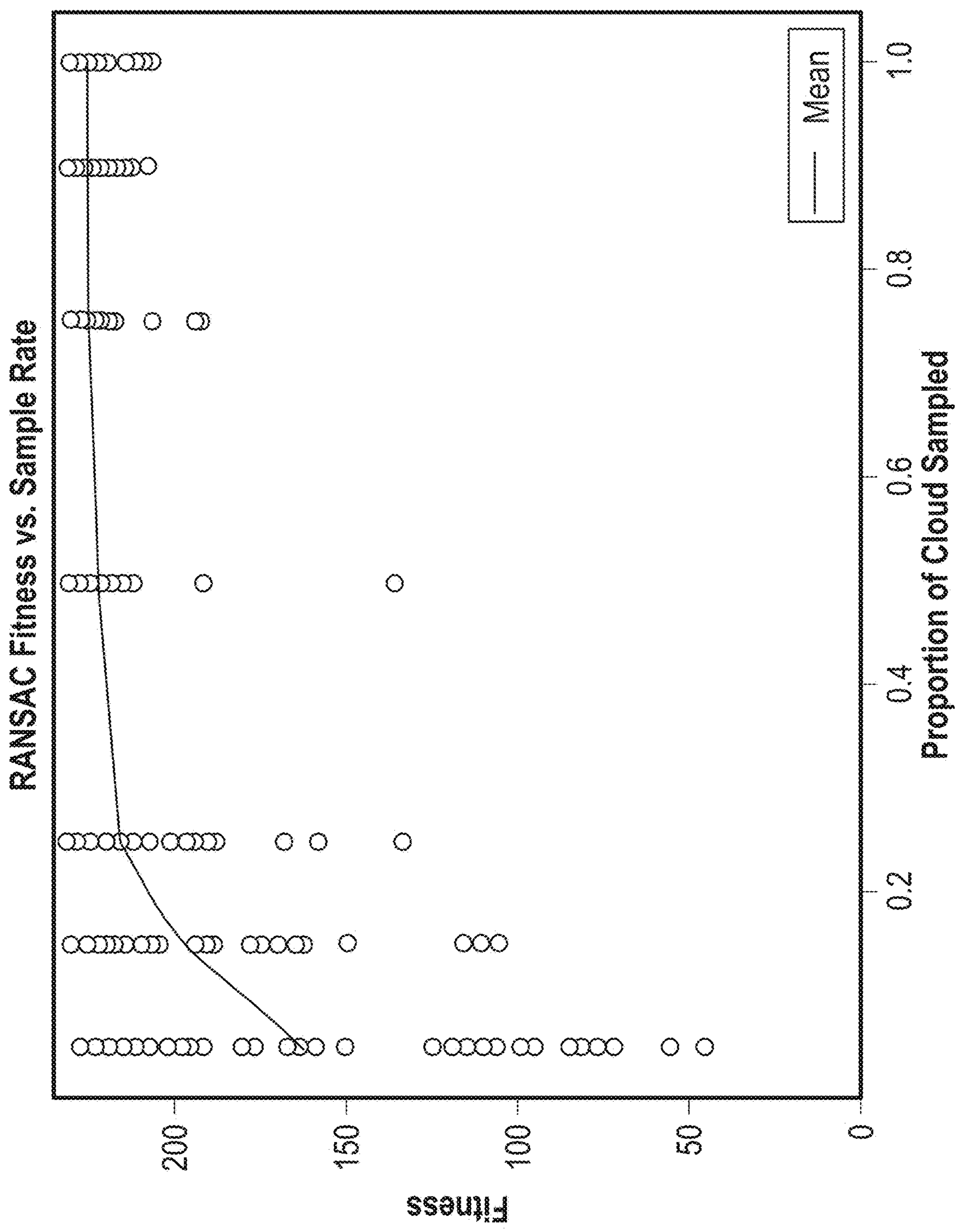
FIG. 5 illustrates a graph of fitness scores determined by an exemplary RANSAC algorithm for various sampled proportions of a point cloud, in accordance with some embodiments.

FIG. 5 shows the fitness scores determined by RANSAC for each sampled point at each sampling proportion. The solid line represents the average fitness score of each proportion. As shown, the average fitness score remained steady from a proportion sampled as low as 0.3 through 1.0 (no downsampling).

Figure 6A:
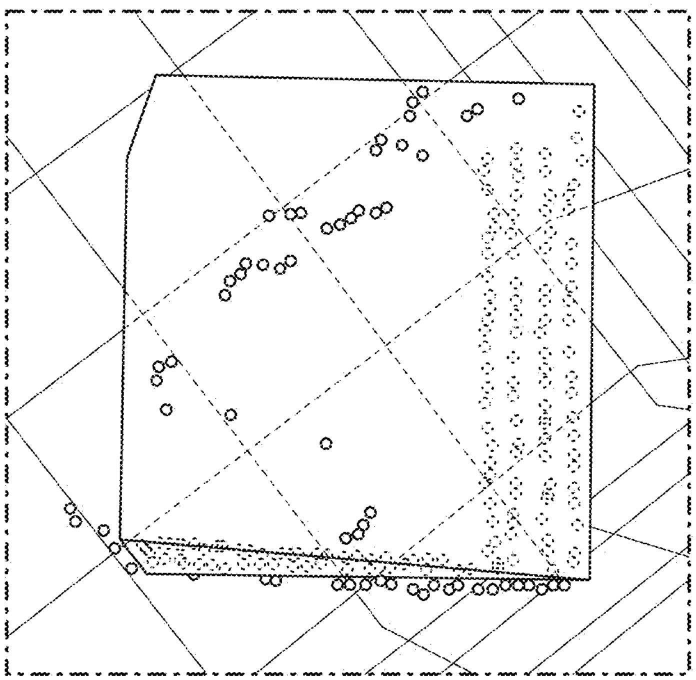
FIG. 6A illustrates a refined label estimated by RANSAC from a randomly sampled subset of a point cloud, in accordance with some embodiments.
Figure 6B:
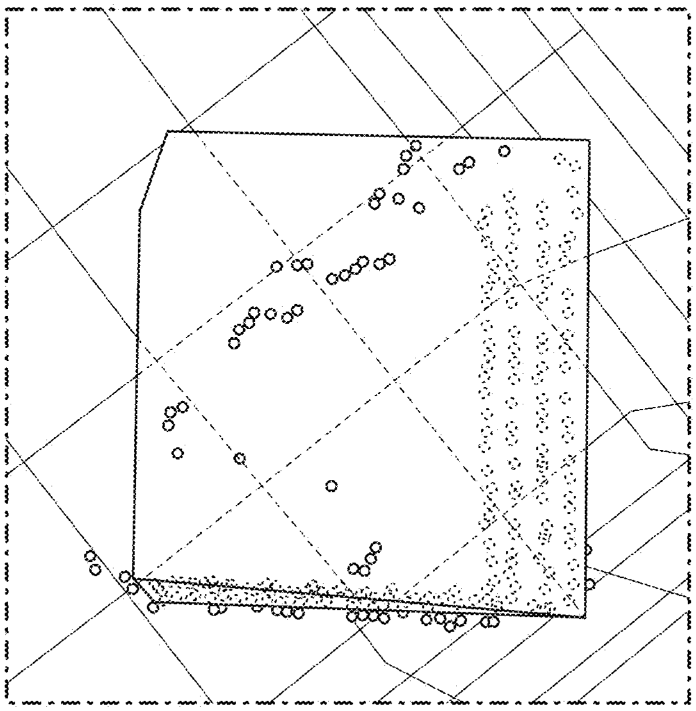
FIG. 6B illustrates a refined label estimated by RANSAC from an entire point cloud, in accordance with some embodiments.

Further, FIG. 6A shows a refined label estimated by RANSAC from a sample of 5% (0.05) of the point cloud, while FIG. 6B shows a refined label estimated without downsampling. As demonstrated by the steady fitness score and comparable accuracy of the refined label estimated from low proportions of the point cloud, the RANSAC refinement method described herein is robust even in point clouds with sparse data. However, since fitness scores generally improved with a higher proportion of the point clouds sampled, using a LiDAR sensor with more channels that can generate more dense point clouds, such as a 64-channel LiDAR, may further improve the accuracy of the refinement method.

Example 3. Manual vs. Automatic Duration

This example quantifies the reduction of time and manual effort due to the use of an exemplary system and method for automatic annotation. Since the majority of time spent during data collection is generally due to the time spent repositioning the object of interest and sensors in between samples, the difference in automatic and manual collection time was not measured. Instead, the automatic collection time was duplicated for both.

In this example, 100 samples were collected using an exemplary mobile data collection rig, and the duration of the automatic annotation was compared to the duration of manual annotation. For the manual annotations, Label Studio was used for the image annotations and labelCloud was used for the point cloud annotations. The automatic annotations were performed in accordance with method 400 described herein.

Figure 7:
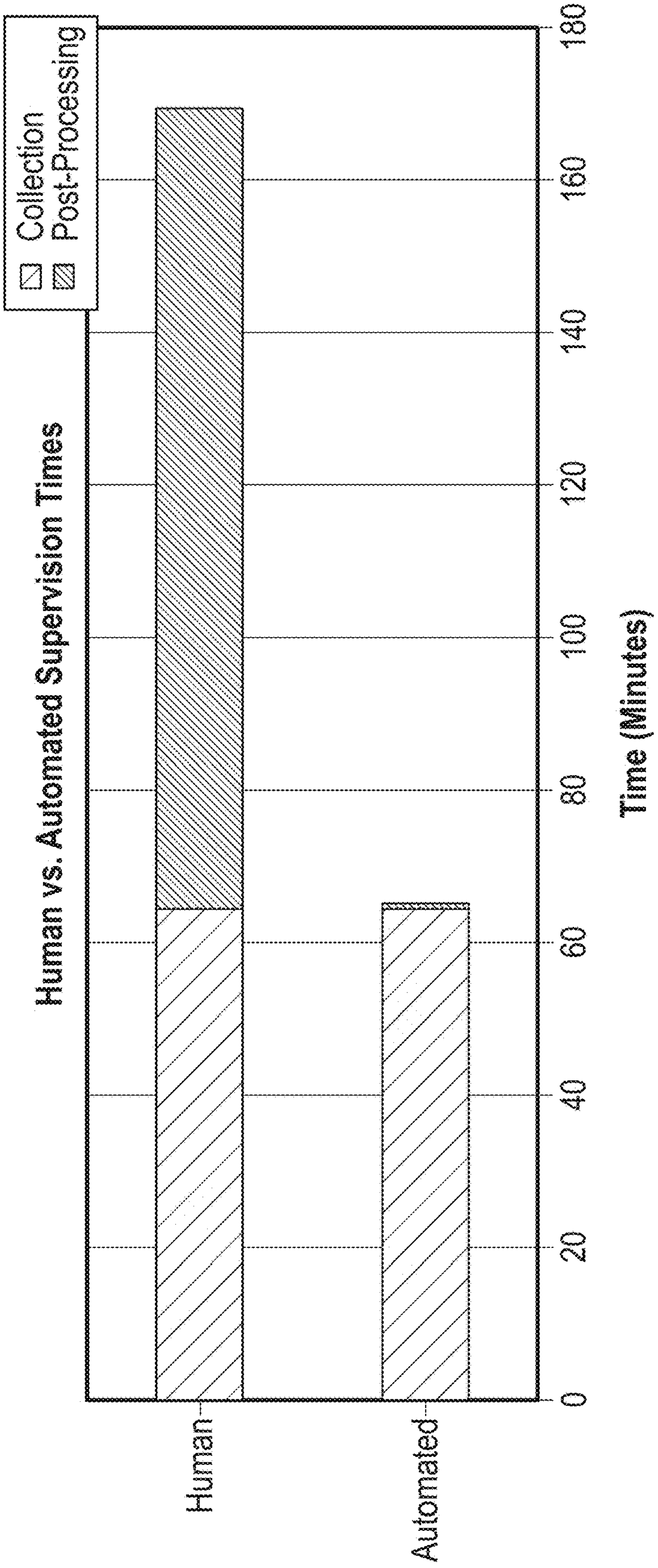
FIG. 7 illustrates a comparison between manual versus automatic annotation times, in accordance with some embodiments.

The results of this example are shown in the chart in FIG. 7. As shown, an automated method as described herein was found to annotate the data 261.8 times faster than a human baseline, eliminated manual labeling effort, and lowered the total time spent creating the dataset by 61.5%.

Example 4. Annotation Accuracy

This example quantifies the accuracy of the automatically generated image and point cloud annotations when compared to manual annotations. In this example, an intersection over union (IOU) function, PyTorch3D's box3d_overlap( ) function, was used to quantify the overlap between the automatic annotations and manual annotations.

Figure 8:
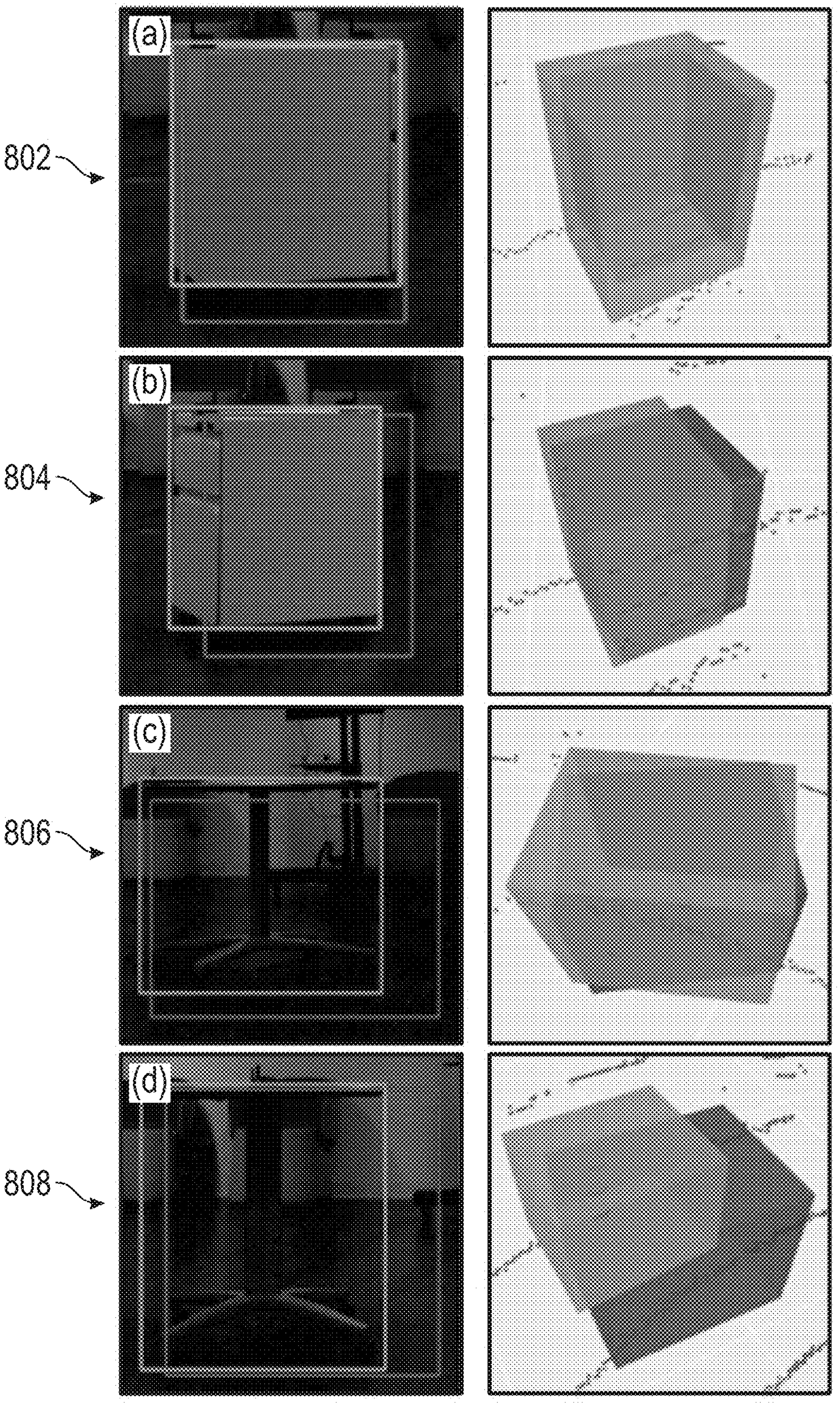
FIG. 8 illustrates a comparison between manual versus automatic annotation accuracy, in accordance with some embodiments.

The results of this example are shown in FIG. 8. Rows 802 and 804 are the annotated images and point clouds of two different perspectives of a filing cabinet. Rows 806 and 808 are the annotated images and point clouds of two different perspectives of a table. The automated annotations are shown in red, while the manual annotations are shown in green.

As shown, the automated annotations appeared to align better with point clouds, while manual annotations aligned better with images. The automated annotations yielded an average IoU of approximately 0.74 with respect to the manual image annotations and approximately 0.44 with respect to the manual point cloud annotations. The low IoU in the automatic point cloud annotations is most likely due to the sparsity of the point cloud, since a 16-channel LiDAR was used. This can be compounded with human error in the ground truth manual annotations due to the point cloud sparsity.

Additionally, much of the low IoU appeared to be contributed by the automated point cloud label shown in row 808, where this particular viewpoint of the table was not covered by the model proposal functions. Accordingly, the IoU found in this example could be improved by increasing the number of channels on the LiDAR sensor, thus increasing the density of the point cloud, as well as refining the model proposal functions to account for various viewpoints of irregularly shaped objects of interest, such as the table.

The invention claimed is:

1. A method of automatically annotating multimodal data samples, the method comprising:

receiving data representing ultrasonic time of flight from a plurality of mobile beacons, wherein the mobile beacons are located on an object of interest and on a mobile data collection rig, and wherein the mobile data collection rig comprises an image sensor and a LiDAR sensor;

estimating position data for the object of interest and position data for the mobile data collection rig in a global coordinate frame based on the data representing ultrasonic time of flight from the plurality of mobile beacons;

computing pose information for the object of interest and pose information for the mobile data collection rig based on the estimated position data of the object of interest and the mobile data collection rig in the global coordinate frame;

computing pose information for the image sensor and pose information for the LiDAR sensor based on the computed pose information for the mobile data collection rig;

collecting image data from the image sensor and LiDAR data from the LiDAR sensor;

determining a first location in the image data based on the computed pose information of the image sensor and determining a second location in the LiDAR data based on the computed pose information of the LiDAR sensor; and automatically annotating the image data with a first set of annotations based on the first location and automatically annotating the LiDAR data with a second set of annotations based on the second location.

2. The method of claim 1, wherein the estimated position data for the object of interest comprises a first portion of estimated position data corresponding to a first mobile beacon and a second portion of estimated position data corresponding to a second mobile beacon.

3. The method of claim 1, wherein the estimated position data for the mobile data collection rig comprises a third portion of estimated position data corresponding to a third mobile beacon and a fourth portion of estimated position data corresponding to a fourth mobile beacon.

4. The method of claim 1, wherein a periphery of an area where the method is to be performed comprises a plurality of stationary beacons.

5. The method of claim 4, wherein estimating position data for the object of interest and position data for the mobile data collection rig in a global coordinate frame comprises transmitting a plurality of signals from each stationary beacon to each mobile beacon.

6. The method of claim 5, wherein the data representing ultrasonic time of flight represents an ultrasonic time of flight from the stationary beacons to the mobile beacons, and wherein estimating position data for the object of interest and position data for the mobile data collection rig in a global coordinate frame comprises triangulating a position of each mobile beacon relative to each stationary beacon based on the data representing ultrasonic time of flight.

7. The method of claim 6, wherein the stationary beacons comprise one or more of indoor positioning system (IPS) transmitters or IPS receivers.

8. The method of claim 6, wherein the global frame is an indoor positioning system (IPS) frame.

9. The method of claim 1, wherein the mobile beacons comprise one or more of IPS transmitters, IPS receivers, inertial measurement unit (IMU) sensors, or global positioning system (GPS) receivers.

10. The method of claim 1, wherein the first and second set of annotations comprise one or more of object of interest class information, object of interest dimensions, object of interest orientation information, and object of interest position information.

11. The method of claim 10, wherein the first and second set of annotations comprise a bounding box based on the object of interest dimensions.

12. The method of claim 10, wherein the object of interest orientation information comprises a yaw of the object.

13. The method of claim 10, wherein the object of interest position information comprises x, y, and/or z coordinates.

14. The method of claim 1, further comprising:

applying one or more fitness functions to the second set of annotations to calculate a fitness score; and refining the second set of annotations based on the fitness score.

15. The method of claim 14, wherein applying one or more fitness functions to the second set of annotations is performed using a random sample consensus (RANSAC) algorithm.

16. The method of claim 14, wherein applying one or more fitness functions to the second set of annotations is performed using an iterative closest point (ICP) algorithm.

17. The method of claim 14, wherein refining the second set of annotations based on the fitness score comprises generating sample bounding boxes from sampled points in the collected LiDAR data using one or more model proposal functions, wherein the model proposal functions are based on the object of interest.

18. The method of claim 17, wherein refining the second set of annotations based on the fitness score further comprises applying the one or more fitness functions to the sample bounding boxes to determine which sample bounding box has the highest fitness score and replacing the bounding box in the second set of annotations with the sample bounding box having the highest fitness score.

19. The method of claim 18, wherein the fitness score is based on the density of points along edges of the sample bounding box such that a higher density of points along the edges yields a higher fitness score.

20. The method of claim 1, comprising using the annotated data to train a multimodal object detection algorithm configured to accept image data and LiDAR data as an input.

21. A system for automatic annotation of multimodal data comprising:

an object of interest;

a mobile data collection rig comprising an image sensor and a LiDAR sensor;

a plurality of mobile beacons located on the object of interest and on the mobile data collection rig;

one or more processors; and memory storing computer program code executable by the one or more processors to cause the system to:

receive data representing ultrasonic time of flight from the plurality of mobile beacons;

estimate position data for the object of interest and position data for the mobile data collection rig in a global coordinate frame based on the data representing ultrasonic time of flight from the plurality of mobile beacons;

compute pose information for the object of interest and pose information for the mobile data collection rig based on the estimated position data of the object of interest and the mobile data collection rig in the global coordinate frame, compute pose information for the image sensor and pose information for the LiDAR sensor based on the computed pose information for the mobile data collection rig;

collect image data from the image sensor and LiDAR data from the LiDAR sensor;

determine a first location in the image data based on the computed pose information of the image sensor and determine a second location in the LiDAR data based on the computed pose information of the LiDAR sensor; and automatically annotate the image data with a first set of annotations based on the first location and automatically annotate the LiDAR data with a second set of annotations based on the second location.

22. The system of claim 21, further comprising two or more stationary beacons configured to be positioned in an area where the multimodal data is to be collected.

23. The system of claim 22, wherein each stationary beacon is configured to transmit a signal to each mobile beacon.

24. The system of claim 23, wherein the data representing ultrasonic time of flight represents an ultrasonic time of flight from the stationary beacons to the mobile beacons, and wherein the system further comprises a ground system controller configured to triangulate a position of each mobile beacon relative to each stationary beacon based on the data representing ultrasonic time of flight.

25. The system of claim 21, wherein the system is a GPS system, and wherein the mobile beacons are global positioning system (GPS) receivers.

26. The system of claim 21, wherein the system is an indoor positioning system (IPS).

27. The system of claim 21, wherein the system is an inertial measurement unit (IMU), system, and wherein the mobile beacons are inertial measurement unit (IMU) sensors.

28. The system of claim 21, wherein the mobile data collection rig is robotic.

29. A non-transitory computer readable storage medium storing one or more programs, the one or more programs comprising instructions, which, when executed by a system comprising:

an object of interest, a mobile data collection rig comprising an image sensor and a LiDAR sensor, a plurality of mobile beacons located on the object of interest and on the mobile data collection rig, and one or more processors, cause the system to:

receive data representing ultrasonic time of flight from the plurality of mobile beacons;

estimate position data for the object of interest and position data for the mobile data collection rig in a global coordinate frame based on the data representing ultrasonic time of flight from the plurality of mobile beacons;

compute pose information for the object of interest and pose information for the mobile data collection rig based on the estimated position data of the object of interest and the mobile data collection rig in the global coordinate frame, compute pose information for the image sensor and pose information for the LiDAR sensor based on the computed pose information for the mobile data collection rig;

collect image data from the image sensor and LiDAR data from the LiDAR sensor;

determine a first location in the image data based on the computed pose information of the image sensor and determine a second location in the LiDAR data based on the computed pose information of the LiDAR sensor; and automatically annotate the image data with a first set of annotations based on the first location and automatically annotate the LiDAR data with a second set of annotations based on the second location.

* * * * *